United States Patent
Suzuki et al.

[19]

[11] Patent Number: 6,141,133
[45] Date of Patent: *Oct. 31, 2000

[54] OPTICAL SCANNING DEVICE AND A SCANNING LENS THEREFOR

[75] Inventors: Seizo Suzuki, Yokohama; Yoshinori Hayashi, Kawasaki; Kouji Masuda, Yokohama, all of Japan

[73] Assignee: Ricoh Company, Ltd., Tokyo, Japan

[*] Notice: This patent is subject to a terminal disclaimer.

[21] Appl. No.: 09/352,872

[22] Filed: Jul. 13, 1999

Related U.S. Application Data

[60] Continuation of application No. 09/177,658, Oct. 23, 1998, Pat. No. 5,986,791, which is a division of application No. 08/738,979, Oct. 24, 1996, Pat. No. 5,875,051.

[30] Foreign Application Priority Data

| Oct. 25, 1995 | [JP] | Japan | 7-277300 |
|---|---|---|---|
| Oct. 27, 1995 | [JP] | Japan | 7-280178 |
| Dec. 27, 1995 | [JP] | Japan | 7-340737 |
| Apr. 17, 1996 | [JP] | Japan | 8-095140 |
| May 15, 1996 | [JP] | Japan | 8-120031 |
| Aug. 5, 1996 | [JP] | Japan | 8-205938 |

[51] Int. Cl.[7] ............................................. G02B 26/08
[52] U.S. Cl. ........................ 359/207; 359/205; 359/216; 359/900
[58] Field of Search ................................. 359/205–207, 359/216–219, 662, 711, 718, 900; 347/256–261

[56] References Cited

U.S. PATENT DOCUMENTS

| 5,005,928 | 4/1991 | Suzuki et al. . | |
|---|---|---|---|
| 5,355,244 | 10/1994 | Suzuki et al. . | |
| 5,418,639 | 5/1995 | Yamazaki | 359/207 |
| 5,459,601 | 10/1995 | Suzuki et al. . | |
| 5,546,216 | 8/1996 | Suzuki . | |
| 5,557,448 | 9/1996 | Endo et al. . | |
| 5,563,729 | 10/1996 | Nakamura et al. | 359/205 |
| 5,619,362 | 4/1997 | Ota | 359/205 |
| 5,710,654 | 1/1998 | Ota | 359/205 |
| 5,986,791 | 11/1999 | Suzuki et al. | 359/207 |

FOREIGN PATENT DOCUMENTS

| 4-50908 | 2/1992 | Japan . |
|---|---|---|
| 7-174998 | 7/1995 | Japan . |

*Primary Examiner*—James Phan
*Attorney, Agent, or Firm*—Oblon, Spivak, McClelland, Maier & Neustadt, P.C.

[57] ABSTRACT

An optical scanning device of the present invention includes a simple scanning lens. At least one of opposite surfaces of the lens has a nonarcuate shape, as seen in a polarization plane. At least one of the opposite surfaces is a special toric surface. Further, in a plane perpendicular to the polarization plane, the lens has a meniscus shape concave toward a polarizer. With this configuration, the lens achieves a desirable uniform velocity scanning capability and a desirable field curvature in the main scanning direction. The lens is therefore free from errors in configuration ascribable to molding while reducing the limitation on the tolerance of optical elements in the optical axis direction as to assembly.

12 Claims, 29 Drawing Sheets

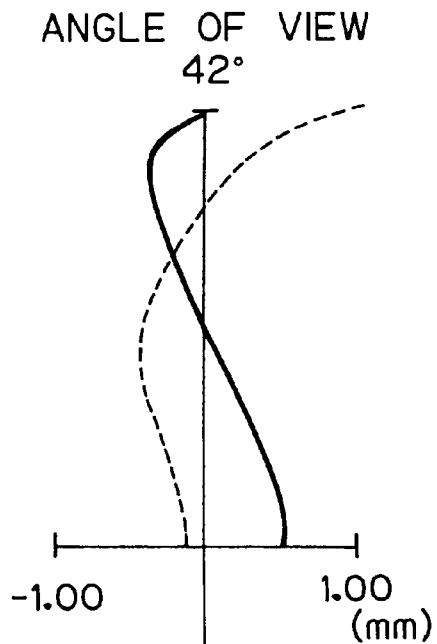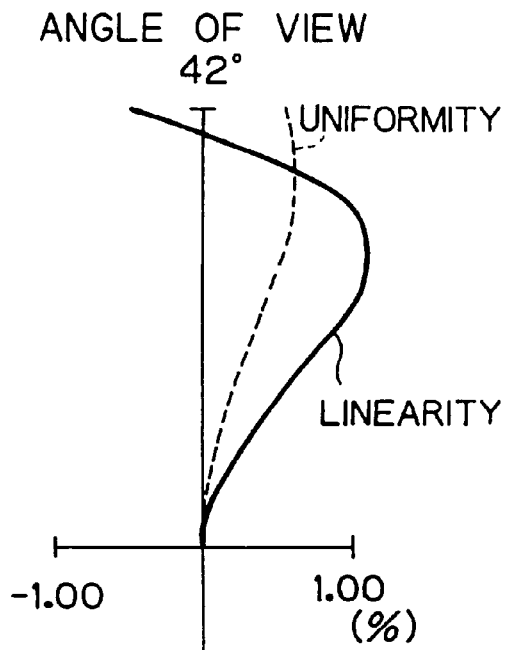
FIG. 4A FIELD CURVATURE
FIG. 4B UNIFORMITY LINEARITY
------ MAIN SCANNING
—— SUBSCANNING

ANGLE OF VIEW 45°

-3.00    3.00 (mm)

FIELD CURVATURE

ANGLE OF VIEW 45°

UNIFORMITY

LINEARITY

-1.00    1.00 (%)

UNIFORMITY LINEARITY

------ MAIN SCANNING
—— SUBSCANNING

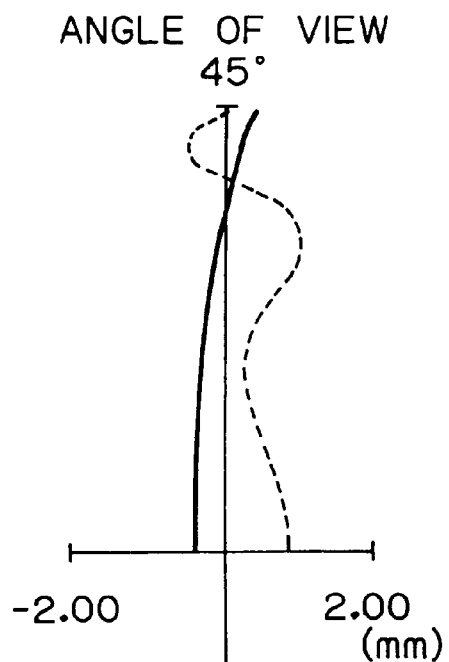
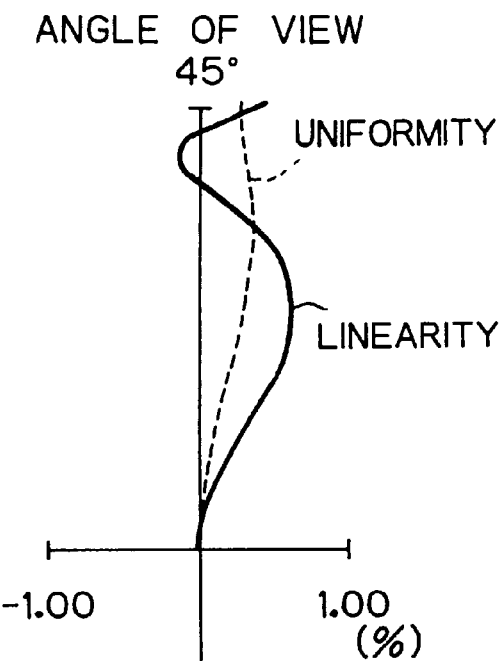
FIG. 6A — FIELD CURVATURE
FIG. 6B — UNIFORMITY LINEARITY
----- MAIN SCANNING
——— SUBSCANNING

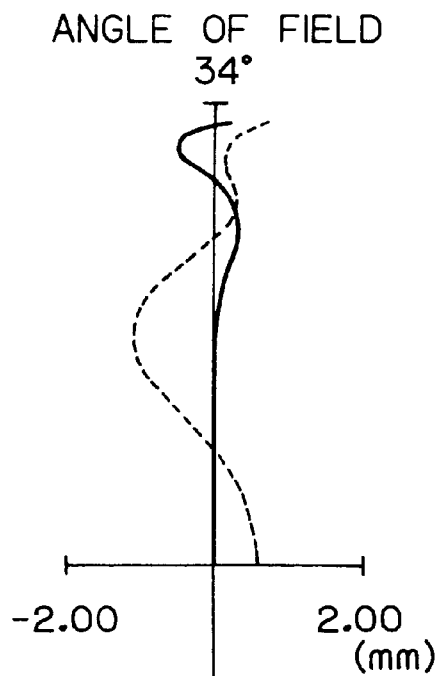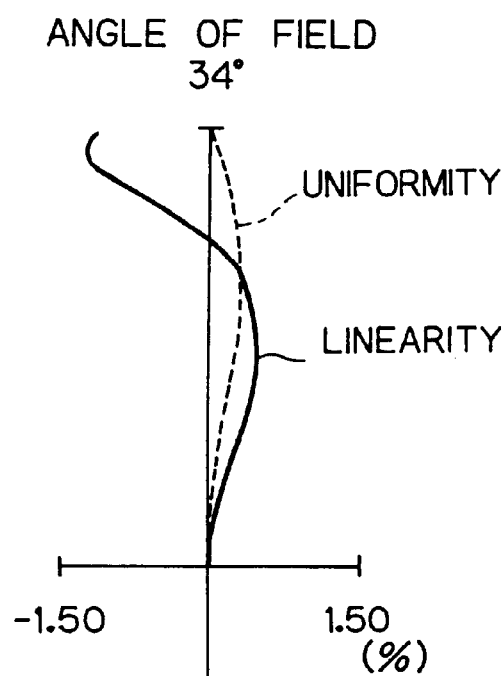

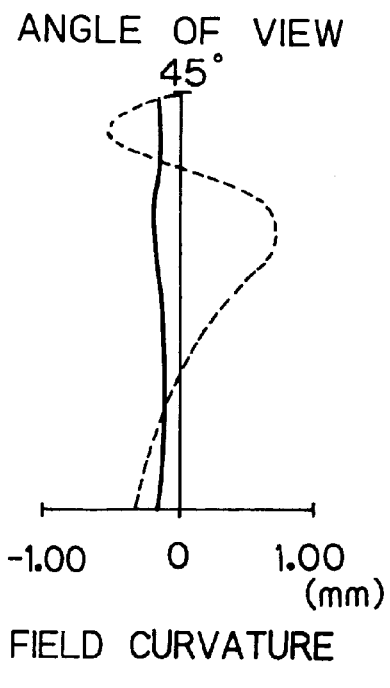
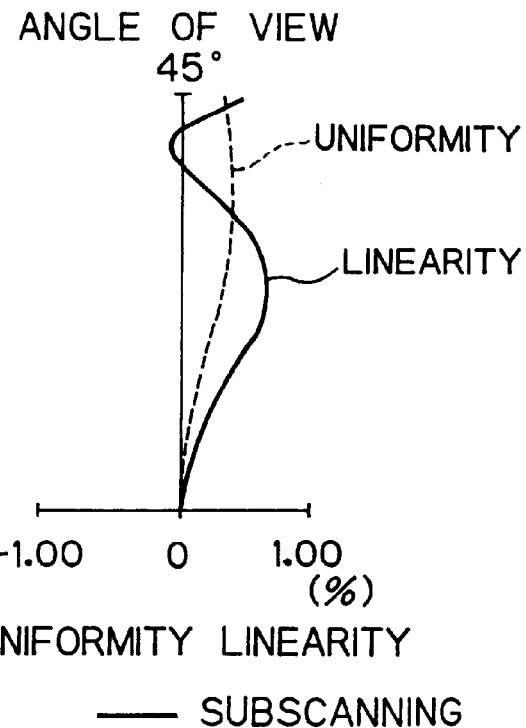
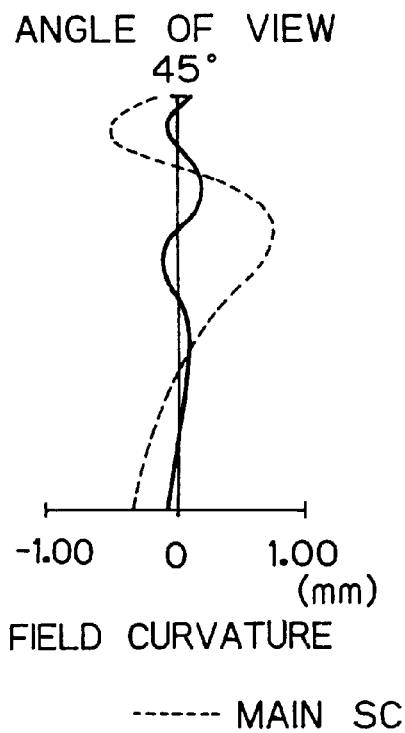
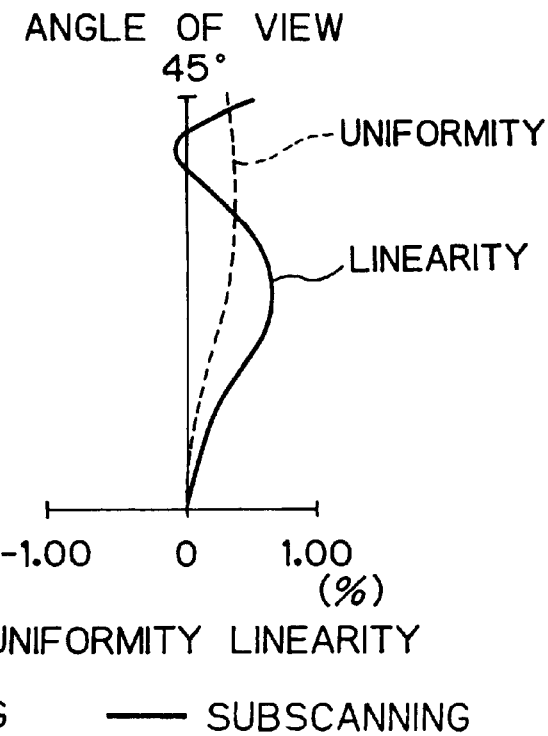

------ MAIN SCANNING    ——— SUBSCANNING

------ MAIN SCANNING    ——— SUBSCANNING

FIELD CURVATURE

UNIFORMITY LINEARITY

------ MAIN SCANNING　　—— SUBSCANNING

FIELD CURVATURE

UNIFORMITY LINEARITY

------ MAIN SCANNING　　—— SUBSCANNING

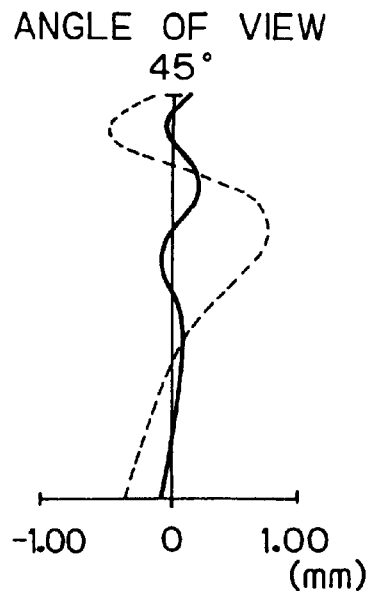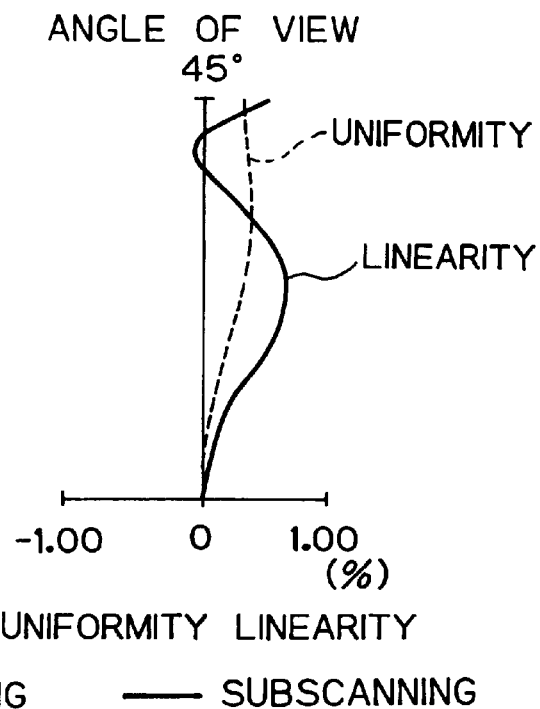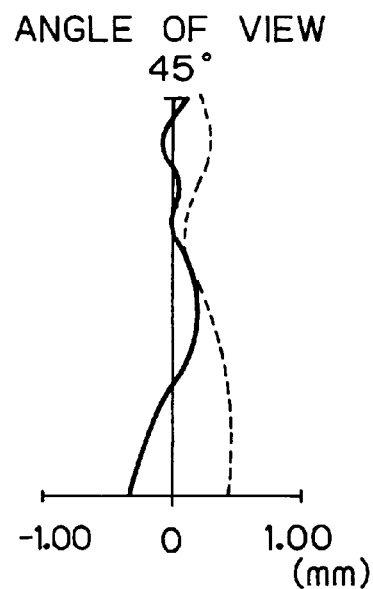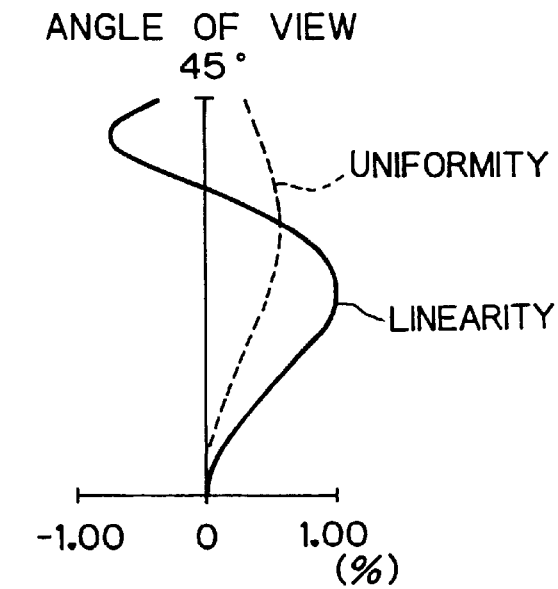

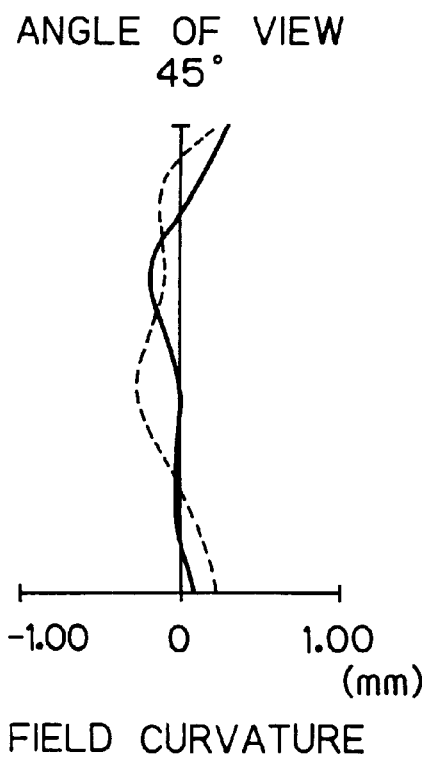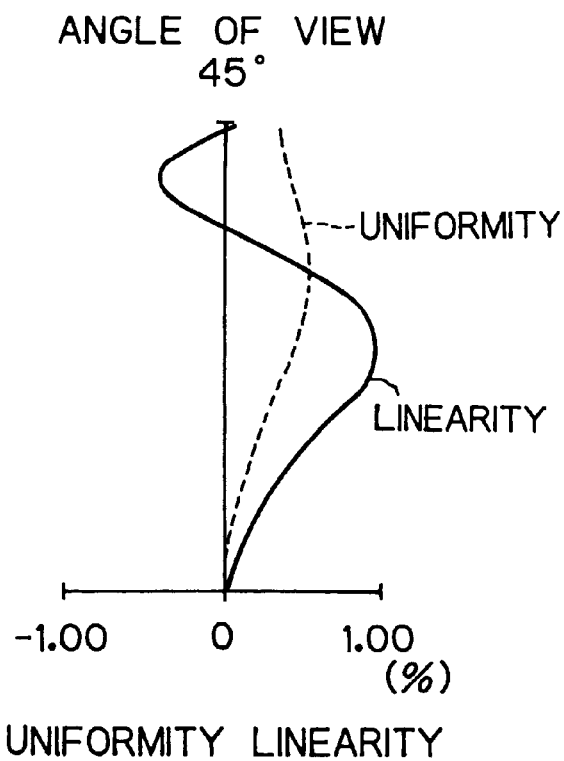
FIG. 16A — FIELD CURVATURE (ANGLE OF VIEW 45°)
FIG. 16B — UNIFORMITY LINEARITY (ANGLE OF VIEW 45°)
------ MAIN SCANNING
——— SUBSCANNING

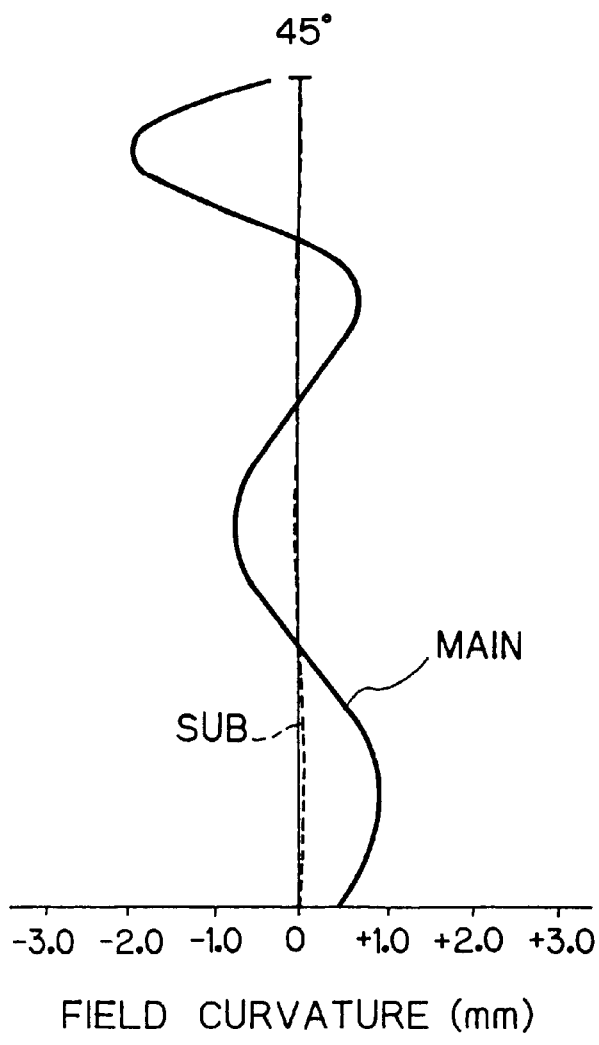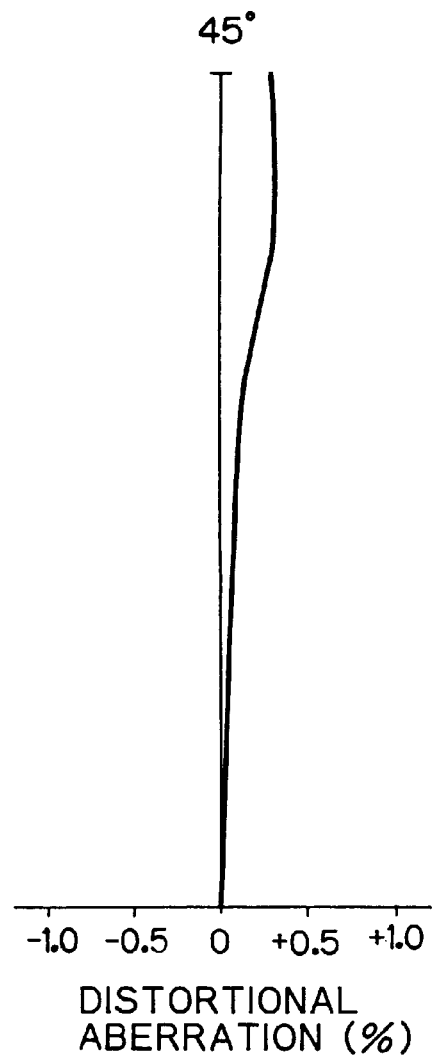

OPTICAL SCANNING DEVICE AND A SCANNING LENS THEREFOR

This application is a Continuation of application Ser. No. 09/177,658 Filed on Oct. 23, 1998, now U.S. Pat. No. 5,986,791, which is a division of application Ser. No. 08/738,979, filed Oct. 24, 1996 now U.S. Pat. No. 5,875,051.

BACKGROUND OF THE INVENTION

The present invention relates to an optical scanning device for use in an image forming apparatus, and a scanning lens therefor.

In an optical scanning device for an optical printer, digital copier or similar image forming apparatus, a polarizer polarizes, at a uniform angular velocity, a beam issuing from a light source and forming a line image elongate in a direction corresponding to a main scanning direction. A scanning lens converges the polarized beam to a desired surface to be scanned in the form of a beam spot. The scanning device scans the desired surface at a uniform velocity with the beam spot. The direction corresponding to the main scanning direction refers to a direction parallel to the main scanning direction at any position on a virtual optical path which is formed by developing linearly an optical path between the light source and the desired surface along the optical axis. Likewise, a direction corresponding to a subscanning direction refers to a direction parallel to a subscanning direction at any position on the above virtual path.

It is a common practice with the scanning device to use a simple scanning lens in order to reduce the size and cost of the device. A simple scanning lens is taught in, e.g., Japanese Patent Laid-Open Publication No. 7-174998. An image forming lens for scanning is disclosed in, e.g., Japanese Patent Laid-Open Publication No. 4-50908.

To prevent the scanning lens from increasing in size, it is preferable that the lens be positioned as close to the polarizer as possible. This, however, brings about a problem that the magnification of the lens increases. For example, if the position where the line image is formed is even slightly deviated on the virtual optical path due to the slight positional error of optics for forming the line image in the optical axis direction, the focusing position of the beam spot is noticeably shifted. As a result, field curvatures are noticeably deteriorated, compared to designed field curvatures. This is particularly true with the field curvature in the subscanning direction.

While the scanning lens functions to cause the polarized beam to converge to the desired surface in the direction corresponding to the subscanning direction, it must implement uniform velocity scanning in the direction corresponding to the main scanning direction. To realize uniform velocity scanning and desirable field curvatures with a simple lens, it is necessary that at least one surface of the lens has a special shape different from an arc in the direction corresponding to the main scanning direction. Generally, the scanning lens is implemented as a convex lens in order to converge the polarized beam to the desired surface in the direction corresponding to the main scanning direction. For this reason, the lens is often formed by molding plastics. However, the problem is that when the lens is provided with a biconvex configuration, the thickness is apt to increase in the paraxial portion and noticeably differs from the paraxial portion to the peripheral portion. Consequently, the lens implemented as a molding of plastics often suffers from sinking, waving and other errors in configuration. The lens with such errors has critically low performance in practice although the designed performance may be optimal. This problem is particularly serious when a wide-angle lens is desired to render the scanning device compact or to extend the scanning range, or when a lens is located in the vicinity of the polarizer in order to reduce the size of the lens.

When use is made of a simple lens, uniform velocity scanning capability will be effectively promoted if the surface of the lens facing the polarizer is provided with a convex shape. In the case, however, the thickness of the lens decreases with a decrease in the radius of curvature, aggravating the difference in thickness between the paraxial portion and the peripheral portion. Moreover, if the radius of curvature of the surface facing the polarizer is small, the angle at which the polarized beam is incident to the above surface, i.e., the angle between the outward normal of the surface and the chief ray of the incident beam increases in the direction corresponding to the main scanning direction. This is likely to deteriorate the field curvatures and uniform scanning due to the errors in the configuration of the above surface.

In addition, the scanning device should preferably have a compact and broad effective main scanning width. The polarizer therefore must have a broad effective polarization angle.

SUMMARY OF THE INVENTION

It is therefore an object of the present invention to provide an optical scanning device having desirable performance including field curvatures in main and subscanning directions and uniform scanning capability, and implementing a broad effective main scanning width, and a scanning lens therefor.

It is another object of the present invention to provide an optical scanning device which frees a simple scanning lens implemented as a molding of plastics from errors in configuration, and the scanning lens.

It is yet another object of the present invention to provide an optical scanning device reducing the limitation on the tolerance of optical elements in the optical axis elements as to assembly, and a scanning lens therefor.

It is a further object of the present invention to provide an optical scanning device capable of reducing the deviation of a simple scanning lens as to a beam spot diameter and ascribable to the image height of the beam spot, and the scanning lens.

It is an additional object of the present invention to provide a compact and high performance optical scanning device using a simple scanning lens.

In accordance with the present invention, in an optical scanning device for causing a polarizer to polarize at a uniform angular velocity a beam forming a line image elongate in a direction corresponding to a main scanning direction with a reflection surface adjoining a position where the line image is formed, and for causing a scanning lens to converge a polarized beam output from the polarizer to a desired surface to be scanned in the form of a beam spot, thereby optically scanning the desired surface at a uniform velocity, the lens is a simple lens whose opposite surfaces are convex in a polarization plane. At least one of opposite surfaces of the lens has, in the polarization plane, a nonarcuate shape determined by R, K, A, B, C, D . . . included in:

$$X = Y^2/\{R + R\sqrt{1-(1+k)(Y/R)^2}\} + A \cdot Y^4 + B \cdot Y^6 + C \cdot Y^8 + D \cdot Y^{10} +$$

where X is the coordinate in the optical axis direction, Y is the coordinate in a direction perpendicular to the optical axis, R is the paraxial radius of curvature, K is a cone constant, and A, B, C, D . . . are high degree coefficients. At least one of the opposite surfaces is a special toric surface such that a line connecting the centers of curvature of the at least one surface in a plane perpendicular to the polarization plane forms a curve different in shape from the at least one surface. An effective main scanning width W, a thickness $d_1$ of the lens on the optical axis and a distance L between the polarization start point of the polarizer and the desired surface satisfy the following relations (1) and (2):

$$W/L > 0.9 \tag{1}$$

$$10 < (W/L)^2 \cdot (L/d_1) < 30 \tag{2}$$

In addition, the lens is implemented as a moulding of plastics.

Also, in accordance with the present invention, in an optical scanning device for causing a polarizer to polarize at a uniform angular velocity a beam forming a line image elongate in a direction corresponding to a main scanning direction with a reflection surface adjoining a position where the line image is formed, and for causing an imaging forming lens to converge a polarized beam output from the polarizer to a desired surface to be scanned in the form of a beam spot, thereby optically scanning the desired surface at a uniform velocity, the is a simple lens. At least one of opposite surfaces of the lens has, in the polarization plane, a nonarcuate shape determined by R, K, A, B, C, D . . . included in:

$$X = Y^2 / \{R + R\sqrt{1-(1+k)Y^2/R^2}\} + A \cdot Y^4 + B \cdot Y^6 + C \cdot Y^8 + D \cdot Y^{10} +$$

where X is the coordinate in an optical axis direciton, Y is the coordinate in a direction perpendicular to the optical axis, R is the paraxial radius of curvature, K is a cone constant, and A, B, C, D . . . are high degree coefficients. At least one of the opposite surfaces is a special toric surface such that a line connecting the centers of curvature of the at least one surface in a plane perpendicular to the polarization plane forms a curve different in shape from the at least one surface. A shape in a plane perpendicular to the polarization plane containing the optical axis is a meniscus shape concave toward the polarizer.

Further, in accordance with the present invention, a scanning lens converges a beam polarized by a polarizer at a uniform angular velocity to a desired surface to be scanned with respect to a direction corresponding to a main scanning direction, and causes the desired surface to be scanned at a uniform velocity in the main scanning direction. The lens is a biconvex simple lens and implemented as a molding of plastics. A first and a second surface of the lens, as counted from the polarizer side, each has, in a polarization plane, a nonarcuate shape determined by R, K, A, B, C, D . . . included in:

$$X = Y^2 / \{R + R\sqrt{1-(1+k)(Y/R)^2}\} + A \cdot Y^4 + B \cdot Y^6 + C \cdot Y^8 + D \cdot Y^{10} +$$

where X is the coordinate in the optical axis direction, Y is the coordinate in a direction perpendicular to the optical axis, R is the paraxial radius of curvature, K is a cone constant, and A, B, C, D . . . are high degree coefficients. An ffective main scanning width W, a thickness $d_1$ of the scanning lens on the optical axis and a distance L between the polarization start point of the polarizer and the desired surface satisfy following relations (1) and (2):

$$W/L > 0.9 \tag{1}$$

$$10 < (W/L)^2 \cdot (L/d_1) < 30 \tag{2}$$

Moreover, in accordance with the present invention, a scanning lens converges a beam polarized by a polarizer at a uniform angular velocity to a desired surface to be scanned with respect to a direction corresponding to a main scanning direction, and causes the desired surface to be scanned at a uniform velocity. The is a simple lens in which at least a surface facing the polarizer has a convex shape in a paraxial portion in a polarization plane. The lens is implemented as a molding of plastics. A first and a second surface of the lens, as counted from the polarizer side, each has, in the polarization plane, a nonarcuate shape determined by R, K, A, B, C, D . . . included in:

$$X = Y^2 / \{R + R\sqrt{1-(1+k)(Y^2/R)^2}\} + A \cdot Y^4 + B \cdot Y^6 + C \cdot Y^8 + D \cdot Y^{10} +$$

where X is the coordinate in the optical axis direciton, Y is the coordinate in a direction perpendicular to the optical axis, R is the paraxial radius of curvature, K is a cone constant, and A, B, C, D . . . are high degree coefficients. An effective main scanning width W, a thickness $d_1$ of the scanning lens in the optical axis direction and a distance L between the polarization start point of the polarizer and the desired surface satisfy the following relations (1) and (2):

$$W/L > 0.9 \tag{1}$$

$$10 < (W/L)^2 \cdot (L/d_1) < 30 \tag{2}$$

In addition, a focal distance fm in the polarization plane and the paraxial radius of curvature $R_1$ of the first surface in the polarization plane satisfy a condition (3):

$$1.0 < R1/fm < 3.0 \tag{3}$$

BRIEF DESCRIPTION OF THE DRAWINGS

The above and other objects, features and advantages of the present invention will become apparent from the following detailed description taken with the accompanying drawings in which:

FIGS. 4–16 plot field curvatures, uniform scanning characteristic and linearity relating to Examples 1–13 of the first embodiment;

FIGS. 18–32 plot field curvatures and distortional aberrations relating to Examples 1–15 of the second embodiment.

DESCRIPTION OF THE PREFERRED EMBODIMENTS

Preferred embodiments of the optical scanning device and a scanning lens therefore in accordance with the present invention will be described hereinafter.

1st Embodiment

Figure 1A:
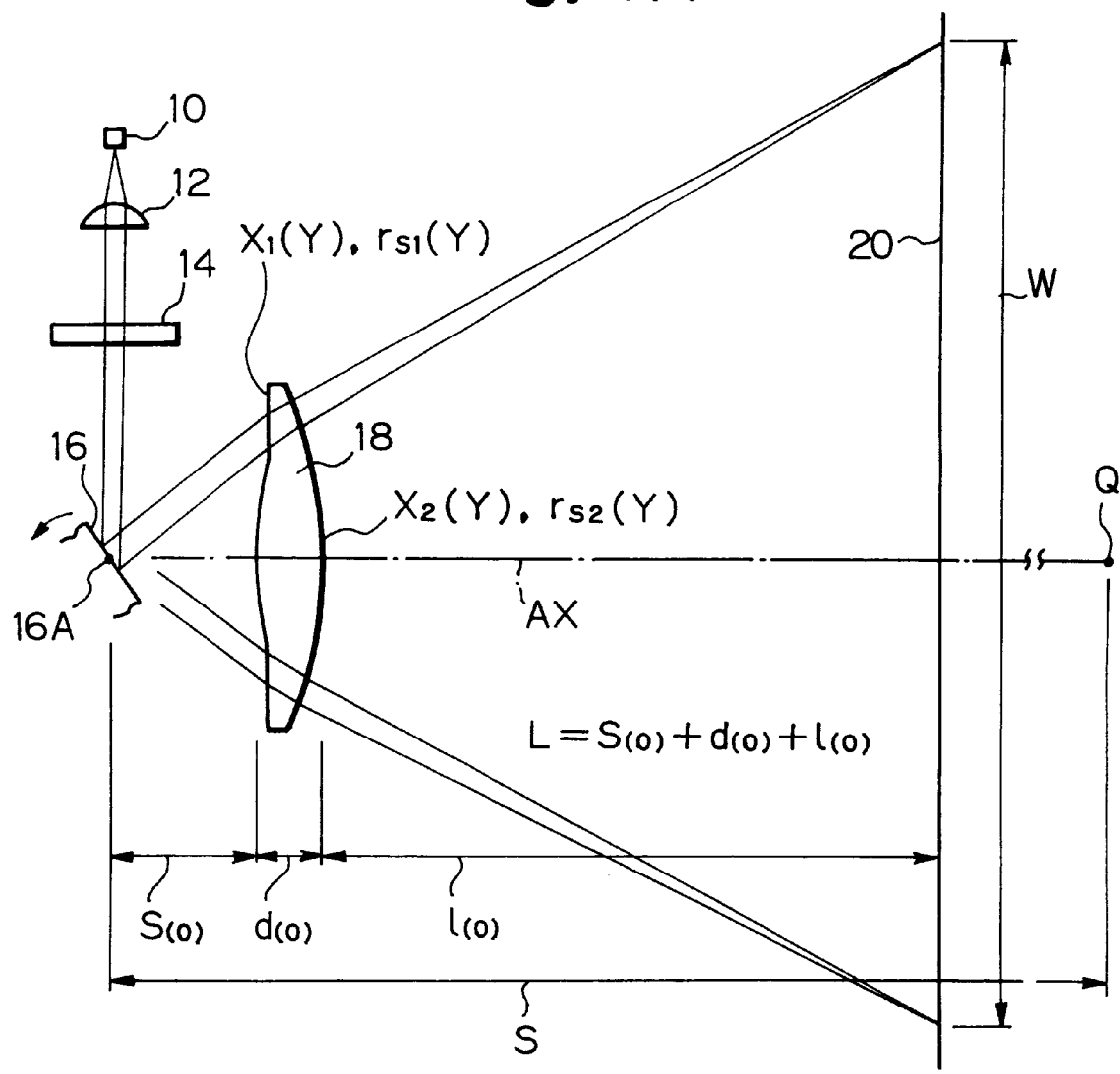
FIGS. 1A and 1B show a first embodiment of the optical scanning device in accordance with the present invention.
Figure 1B:
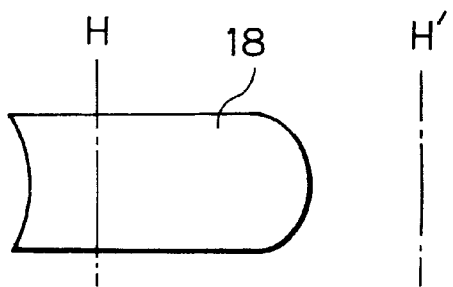

Referring to FIGS. 1A and 1B of the drawings, an optical scanning device embodying the present invention is shown. As shown, the device includes a laser diode or emission source (LD) 10 and a coupling lens 12. The coupling lens 12 constitutes a light source together with the LD 10. A divergent beam issuing from the LD 10 is coupled by the coupling lens 12 and then converged by a cylinder lens 14 in the direction corresponding to the subscanning direction (perpendicular to the sheet surface of FIG. 1A). As a result, the beam forms an line image elongate in the direction corresponding to the main scanning direction on a reflection surface 16 included in a polarizer. In the illustrative embodiment, the polarizer is assumed to be a rotary single-surface mirror. The reflection surface 16 has an axis of rotation 16A lying in the surface 16. The line image is formed such that its chief ray runs through the position of the axis 16A. This embodiment is free from the deviation between the line image and the reflection surface 16, i.e., so-called sag ascribable to the rotation of the surface 16. The cylinder lens 14 may be replaced with a cylinder mirror, if desired.

When the reflection surface 16 rotates at a uniform angular velocity, the reflected beam is also polarized at a uniform angular velocity and turns out a polarized beam. The polarized beam is incident to a simple scanning lens 18. The lens 18 focuses the incident beam in the form of a spot onto a desired surface 20 to be scanned. As a result, the surface 20 is scanned at a uniform velocity. Usually, a photoconductive element is located at the surface 20 and scanned by the above beam spot to form an image thereon.

As shown in FIG. 1A, the lens 18 is a biconvex lens, as seen in a polarization plane. The lens 18 may have any shape in the plane perpendicular to the polarization plane and including an optical axis AX; it may also be biconvex. Assume that the lens 18 has a meniscus shape concave toward the polarizer, as seen in the plane perpendicular to the polarization plane and containing the optical axis. Then, as shown in FIG. 1B, both the front major plane H and the rear major plane H' can be set at the surface 20 side. Even when the lens 18 is positioned in the vicinity of the polarizer, the major surfaces H and H' are positioned closer to the surface 20 than the substance of the lens 18. This successfully reduces the increases in the lateral magnification in the direction corresponding to the subscanning direction. As a result, the limitation on the tolerance as to the assembly of the cylinder lens 14 in the optical axis direction is effectively reduced.

Assume that the effective main scanning width of the lens 18 is W, and that the distance between the polarization start point of the polarizer and the surface 20 is L. Then, the width W and distance L satisfy a condition:

$$W/L > 0.9 \quad \text{condition (1)}$$

The above condition (1) holds when the image height is zero; the distance L is equal to (S0)+d(0)+l(0) shown in FIG. 1A. As the ratio W/L increases, the angle of view of the lens 18 increases and renders the scanning device more compact. When the ratio W/L decreases below the lower limit of 0.9, a broad effective main scanning width and therefore a compact arrangement is not achievable.

Assuming that the lens 18 has a thickness $d_1$, then the width W, length L and thickness $d_1$ satisfy a condition:

$$10 < (W/L)^2 \cdot (L/d_1) < 30 \quad \text{condition (2)}$$

To implement a compact scanning device with a scanning lens whose thickness differs little from its paraxial portion to its peripheral portion, it is preferable that the ratio $L/d_1$ ($d_1 = d(0)$ shown in FIG. 1A) and the product $(W/L)^2 \cdot (L/d_1)$ satisfy the above condition (2).

As the parameter $(W/L)^2 \cdot (L/d_1)$ of the condition (2) decreases with the condition (1) satisfied, the thickness $d_1$ on the optical axis and therefore the difference in thickness between the paraxial portion and the peripheral portion increases. This is undesirable when it comes to the molding of plastics. As the parameter $(W/L)^2 \cdot (L/d_1)$ decreases below the lower limit of 10 included in the condition (2), the above disadvantage is aggravated. This brings about sinking or waving in the event of molding. While values above the upper limit of 30 included in the condition (2) reduce the difference in thickness and promotes accurate molding, the resulting lenses will be too thin to implement field curvatures and uniform velocity scanning.

On the other hand, when the beam incident to the lens 18 is a parallel beam, i.e., when the lens 18 is used as an f-θ lens, the condition (2) poses a heavy limitation on design freedom. Specifically, to satisfy the condition (2) when the beam incident to the lens 18 is a parallel beam, the ratio d(0)/l(0) shown in FIG. 1A must be limited to about 0.2. As a result, the position of the lens 18 is extremely limited. This limitation on design freedom can be obviated if the beam incident to the lens 18 is divergent or convergent with respect to the direction corresponding to the main scanning direction.

A nonarcuate toric surface and a special toric surface will be described. A toric surface is defined as a curved surface which an arc forms when rotated about a line or axis lying in the same plane as the arc, but not passing through the center of the arc. A nonarcuate toric surface is a plan which a nonarcuate shape forms when rotated about a line or axis lying in the same plane as the nonarcuate shape.

Figure 2A:
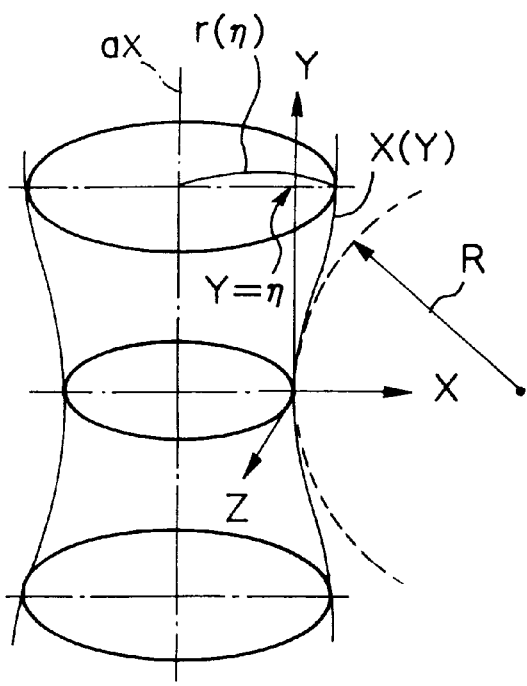
FIGS. 2A–2C are views showing a nonarcuate toric surface and special toric surfaces.

FIG. 2A shows a specific nonarcuate toric surface. In FIG. 2A, X(Y) is representative of a nonarcuate shape produced by:

$$X = Y^2 / [R + R\sqrt{1-(1+K)(Y/R)^2}] + A \cdot Y^4 + B \cdot Y^6 + C \cdot Y^8 + D \cdot Y^{10} + \quad \text{Eq. (1)}$$

where X is the coordinate of the lens 18 in the optical axis direction, Y is the coordinate in the polarization plane in the direction perpendicular to the optical axis direction, R is the paraxial radius of curvature, K is the cone constant, and A, B, C, D and so forth are higher degree coefficients.

The nonarcuate toric surface shown in FIG. 2A is formed when the nonarcuate shape (X(Y)) is rotated about an axis ax parallel to the Y axis. Assume that the Y coordinate of a section in a plane parallel to the XZ plane is Y=η. Then, the radius of curvature of the nonarcuate toric surface in the above section is r(η), as shown in FIG. 2A. In the nonarcuate toric surface, the centers of curvature in the plane parallel to the XZ plane coincide with the axis ax without exception. That is, a line connecting the above centers of curvature is the axis ax itself.

Figure 2B:
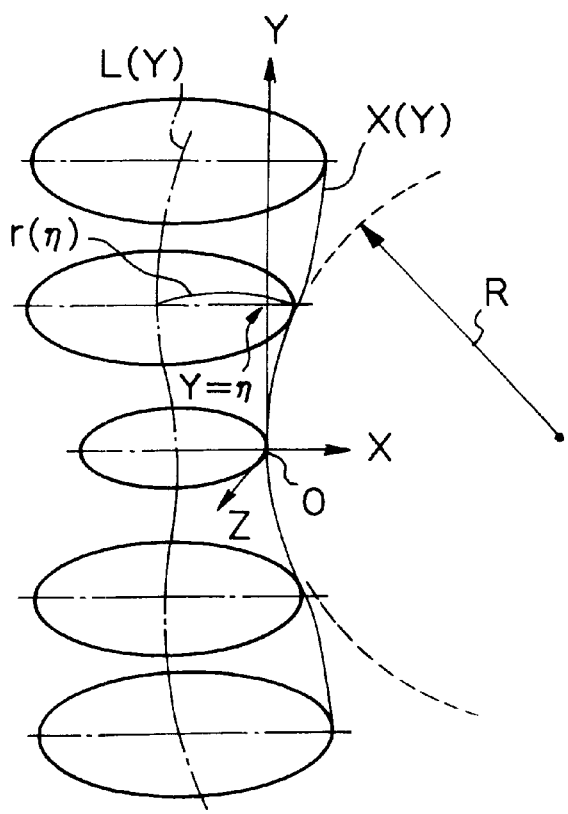
Figure 2C:
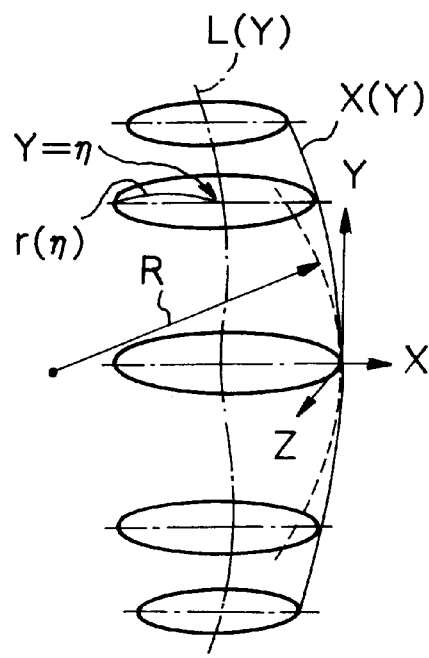

FIGS. 2B and 2C each shows a particular special toric surface. In FIGS. 2B and 2C, X(Y) is representative of a curve lying in the XY plane. While X(Y) is shown as being nonarcuate, it may be a simple arc or a line parallel to the Y axis. In the special toric surfaces, at each point of the curve X(Y), the radius of curvature in a plane parallel to the XZ plane is defined as a function of the coordinate Y. Further, the center of curvature at each Y coordinate position lies in the XY plane. Moreover, a curve L(Y) connecting the centers of curvature also lies in the XY plane. In addition, the curve L(Y) is different in shape from the curve X(Y). In the special toric surface of FIG. 2B, the curve L(Y) is located at the opposite side to the paraxial center of curvature (paraxial radius of curvature R) of the curve X(Y). On the other hand, in the special toric surface of FIG. 2C, the curve L(Y) is located at the same side as the paraxial center of curvature of the curve X(Y).

In the following description, the surfaces of the lens 18 lying in the polarization plane and facing the polarizer and the surface 20, respectively, will be represented by $X_1(Y)$ and $X_2(Y)$. Y is the coordinate in the direction corresponding to the main scanning direction and having the optical axis AX as an origin. Let the surfaces of the lens 18 facing the polarizer and the surface 20, respectively, and in the plane in the direction corresponding to the main scanning direction be represented by $r_{s1}(Y)$ and $r_{s2}(Y)$; $r_{s1}(Y)$ is the radius of curvature, at the coordinate Y, of the surface facing the polarizer and lying in the plane perpendicular to the polarization plane while $r_{s2}(Y)$ is the radius of curvature, at the coordinate Y, of the surface facing the surface 20 and lying in the plane perpendicular to the polarization plane.

In the illustrative embodiment, at least one of the lens surfaces $X_1(Y)$ and $X_2(Y)$ has a nonarcuate shape while at least one of them is a special toric surface. Therefore, by selecting the nonarcuate surface adequately, it is possible to correct field curvature and uniform velocity scanning characteristic in the main scanning direction optimally. In addition, by selecting the special toric surface adequately, it is possible to correct field curvature and uniform velocity scanning characteristic in the subscanning direction optimally. For example, both surfaces of the lens 18 may be nonarcuate surfaces, as seen in the polarization plane, or may be special toric surfaces. This enhances the free correction of field curvature and uniform scanning characteristic in the main and subscanning directions, and thereby make the correction easier.

Figure 3A:
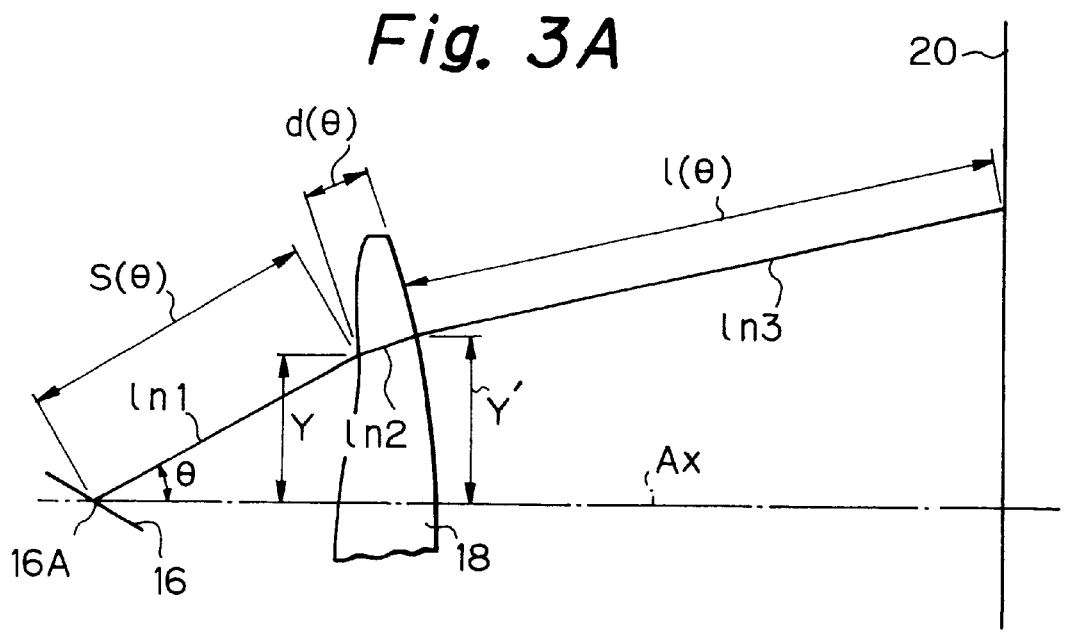
FIG. 3 are views representative of conditions (3) and (4) to be described.

FIG. 3A shows the chief ray of the beam polarized by an angle θ at the position of the axis of rotation 16A of the reflection surface 16. The chief ray, labeled ln1, is incident to the surface of the lens 18 facing the polarizer at a position Y in the direction corresponding to the main scanning direction. The chief ray ln1 is refracted by the lens 18 to turn out a ray ln2. The ray ln2 is propagated through the lens 18 until it leaves the lens 18 as a ray ln3. The ray ln3 is output from the surface of the lens 18 facing the surface 20 at a position Y' in the direction corresponding to the main scanning direction. Then, the ray ln3 is incident to the surface 20.

As shown in FIG. 3A, the distance between the the position where the line image is formed (position of the axis of rotation 16A) and the point of incidence, i.e., the length of the ray ln1 is S(θ). The distance between the input point the output point, i.e., the length of the ray ln2 in the lens 18 is d(θ). Further, the distance between the output point and the image forming point in the direction corresponding to the subscanning direction, i.e., the length of the ray ln3 is l(θ). The plane containing the parts of the chief ray ln1, ln2 and ln3 and perpendicular to the sheet surface of FIG. 3A is the plane perpendicular to the polarization plane. In such a perpendicular plane containing the ray ln1, the effective paraxial radius of curvature of the lens surface at a position Y is $r_{s1}'(Y)$. Likewise, in the perpendicular plane containing the ray ln2. the effective paraxial radius of curvature of the lens surface at a position Y' is $r_{s2}'(Y)$. Therefore, Y is equal to Y' when the polarization angle θ is zero degree. In this condition, S(0), d(0) and l(0) shown in FIG. 1A hold, and the sum thereof is the previously stated length L of the optical path.

Figure 3B:
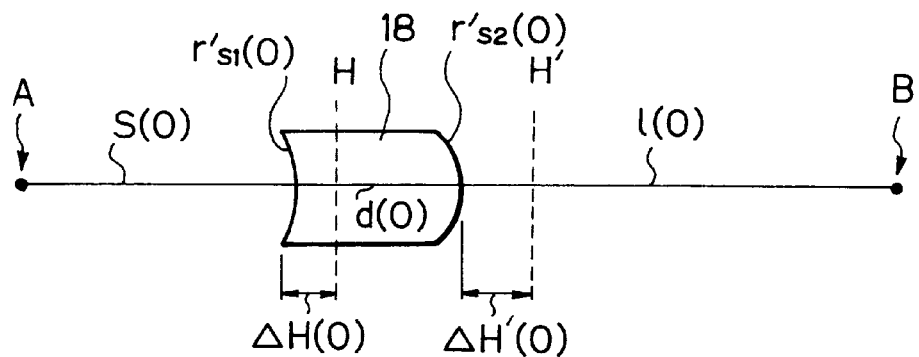

FIG. 3B is a section of the lens 18 in the plane perpendicular to the polarization plane containing the optical axis. In FIG. 3B, A indicates the polarization start point of the chief ray by the reflection surface 16 while B indicates the image forming (in the subscanning direction) of the beam spot. H and H' respectively indicate the front and rear major planes on the optical axis in the direction corresponding to the subscanning direction. Assume that the deviation between the surface of the lens 18 facing the polarizer and the major plane H is ΔH(0), and that the deviation between the other surface of the lens 18 facing the surface 20 and the rear major plane H' is ΔH'(0). Then, the deviations ΔH(0) and ΔH'(0) are expressed as:

$$\Delta H(0) = -r_{s1}'(0) \times d(0)/[n\{r_{s2}'(0)-r_{s1}'(0)\}+(n-1)\cdot d(0)]$$

$$= -r_{s1}'(0) \times P(0)$$

$$\Delta H'(0) = -r_{s2}'(0) \times P(0)$$

In this condition, the lateral magnification β(0) in the direction corresponding to the subscanning direction has an absolute value produced by:

$$|\beta(0)| = \{l(0)-\Delta H'(0)\}/\{S(0)+\Delta H(0)\}$$

$$= \{l(0)+r_{s2}'(Y)\cdot P(0)\}/\{S(0)-r_{s1}'(Y)P(0)\}$$

where $r_{s1}'(0)=r_{s1}(0)$ and $r_{s2}'(0)=r_{s2}(0)$.

Therefore, by providing the lens 18 with the above meniscus shape ($r_{s2}(0)<0$ and $r_{s1}(0)<0$), it is possible to bring both the front and rear chief points closer to the image, i.e., surface 20 and reduce the magnification |β(0)| in the direction corresponding to the subscanning direction. In this case, the longitudinal magnification is $\beta^2(0)$.

In FIG. 1A, when the position of the cylinder lens 14, for example, is dislocated by Δ in the optical axis direction, the imaging forming position of the beam spot in the subscanning direction is shifted by $\Delta \times \beta^2(0)$ in the optical axis direction. Therefore, to accommodate a greater positional error Δ, the absolute value |β(0)| of the magnification should preferably be as small as possible. While the lens 18 may be brought closer to the surface 20 in order to reduce |β(0)|, such an approach is apt to increase the thickness and effective diameter (in the main scanning direction) of the lens 18.

The illustrative embodiment accommodates a greater tolerance as to the assembly of the optical elements in the optical axis direction while implementing a compact lens by positioning it as close to the polarizer as possible. This can be done if the following condition is satisfied:

$$1.45 \leq |\beta(0)| \leq 4.75 \qquad \text{condition (3)}$$

If |β(0)| decreases below the above lower limit of the condition (3), the thickness of the lens 18 increases, and moreover it is difficult to correct the field curvatures and uniform scanning characteristic desirably. If |β(0)| increases above the upper limit, the tolerance in the main scanning direction is severely restricted.

Figure 3C:
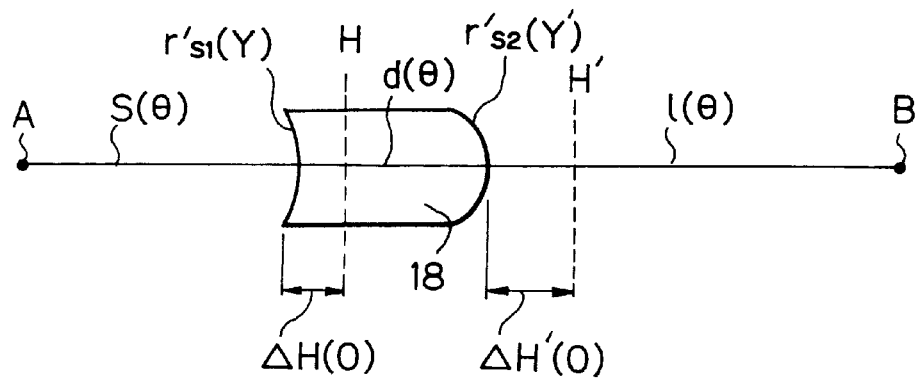

FIG. 3C shows an image forming condition with respect to the chief ray of the beam polarized by the angle θ. As shown, ΔH(θ) and ΔH'(θ) are expressed as:

$$\Delta H(\theta) = -r_{s1}'(\theta) \times d(\theta)/[n\{r_{s2}'(Y)-r_{s1}'(Y)\}+(n-1)\cdot d(\theta)]$$

$$= -r_{s1}'(0) \times P(\theta)$$

$$\Delta H'(\theta) = -r_{s2}'(\theta) \times P(\theta)$$

The lateral magnification in the direction corresponding to the subscanning direction with respect to the θ polarized beam has the following absolute value:

$$|\beta(\theta)| = \{l(\theta) + r_{s2}'(Y') \cdot P(\theta)\} / \{S(\theta) - r_{s1}'(Y)P(\theta)\}$$

The lateral magnification in the direction corresponding to the subscanning direction with respect to the beam with the polarization angle θ has the following absolute value:

$$|\beta(\theta)| = \{l(\theta) + r_{s2}'(Y') \cdot P(\theta)\} / \{S(\theta) - r_{s1}'(Y)P(\theta)\}$$

Then, when the beam with the polarization angle θ forms a spot at a point B, the spot has a diameter:

$$\omega_1 = |\beta(\theta)| \cdot \omega_0$$

where ω0 is the beam width, in the direction corresponding to the subscanning direction, of the line image formed at the polarization start point.

If $|\beta(\theta)|$ is noticeably scattered together with the polarization angle θ, the diameter of the spot also noticeably changes. The allowable scattering of the spot diameter between image heights is usually less than ±5%.

In the illustrative embodiment, $|\beta(\theta)|$ satisfies the following condition in the effective scanning range:

$$0.95|\beta(0)| \leq |\beta(\theta)| \leq 1.05|\beta(0)| \qquad \text{condition (4)}$$

The above condition (4) must be satisfied in order to stabilize the spot diameter in the subscanning direction. The values $r_{s1}'(Y)$ and $r_{s2}'(Y')$ are so selected as to satisfy the condition (4).

In the foregoing description, the polarizer is assumed to be a rotary single-surface or two-surface mirror or a polygonal mirror free from sag. Although a polygonal mirror is apt to bring about sag and thereby slightly deteriorate the field curvatures and uniform scanning characteristic, this can be improved on the basis of, e.g., the shift or the tilt of the lens 18.

Specific examples of the illustrative embodiment will be described hereinafter. Referring again to FIG. 1A, the beam coupled by the coupling lens 12 may turn out a parallel beam, a weak divergent beam or a weak convergent beam, as stated earlier. Assume that the beam coupled by the coupling lens 12 turns out a weak convergent beam, that the deflection angle θ of the reflection surface 16 is zero degree, and that the cylinder lens 14 and lens 18 are absent. Then, the beam converges to a point Q rearward of the rear of the surface 20. Let this point Q be referred to as a natural convergence point. The distance between the polarization start point of the reflection surface 16 and the natural convergence point Q is labeled S. Assume that the distance S is positive when the point Q is positioned at the surface 20 side or negative when it is positioned closer to the light source than the reflection surface 16. When the distance S is negative, the coupled beam is a weak divergent beam. When the coupled beam is a parallel beam, there holds S=∞.

Examples to be described assume a polarizer free from sag. Labeled n is the refractive index associated with the wavelength (780 nm) of the material of the lens 18 used. The nonarcuate shape is determined on the basis of the Eq. (1) using R, K, A, B, C and D. As for a special toric surface, the radius of curvature $r_{si}(Y)$ (i=1, 2) at the coordinate in the plane perpendicular to the polarization plane is determined by giving coefficients a, b, c, d, e, f . . . in the following equation:

$$r_{si}(y) = a + bY^2 + cY^4 + dY^6 + eY^8 + fY^{10} + \ldots \qquad \text{Eq. (2)}$$

In the notation of the higher degree coefficients A, B, C, D, b, c, d, e, f, . . . , E and a numerical value following it indicate power. For example, "E-9" means $10^{-9}$. The unit of an amount having a dimension of distance is mm.

Example 1

W=216, L=213.2, S=3245.2 (beam coupled by the coupling lens 12 is a weak convergent beam)
S(0)=49.0
nonarcuate toric surface d(0)=21.754 n=1.53664
special toric surface l(0)=142.446
surface facing polarizer: nonarcuate toric surface
  $X_1(Y)$ (arcuate shape)
  R=461.302, K=35.937,
  A=-2.205E-7, B=2.732E-11,
  C=-4.9587E-15, D=1.6248E-19
  $r_{s1}(Y)$
  $r_{s1}(0)$=-73.845
surface facing surface 20: special toric surface
  $X_2(Y)$ (arcuate shape)
  R=-97.244
  in $r_{s2}(Y) = a + bY^2 + cY^4 + dY^6 + eY^8 + fY^{10}$
    a=-20.63952, b=8.2661E-4
    c=1.3218E-7, d=2.09082E-11
    e=-5.3157E-15, f=-4.71E-19
in condition (1): W/L≈1.01
in condition (2) $(W/L)^2 \cdot (L/d_1)$=10.1

FIG. 4 shows field curvatures, uniform scanning characteristic and linearity relating to Example 1. The uniform scanning characteristic is defined as $[\{h'(\theta) - h(\theta)\} \times 100$ (%) where $h(\theta(= \text{constant} \times \theta))$ is the ideal image height for the polarization angle θ while $h'(\theta)$ is the actual image height. In FIG. 4, a field curvature in the main scanning direction and a field curvature in the subscanning direction are indicated by a dashed curve and a solid curve, respectively.

Example 2

Figure 5A:
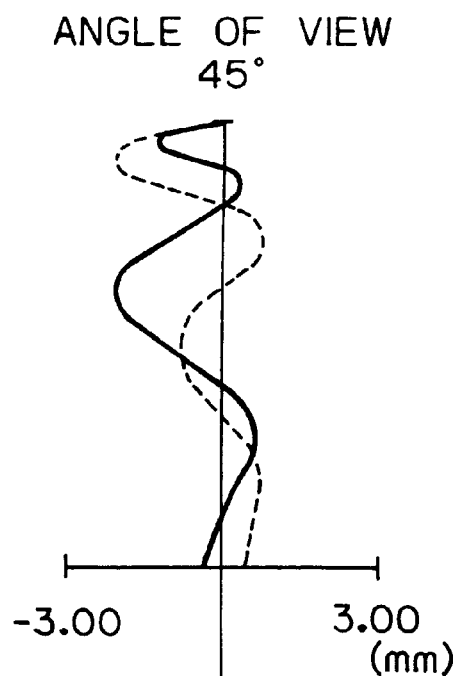
Figure 5B:
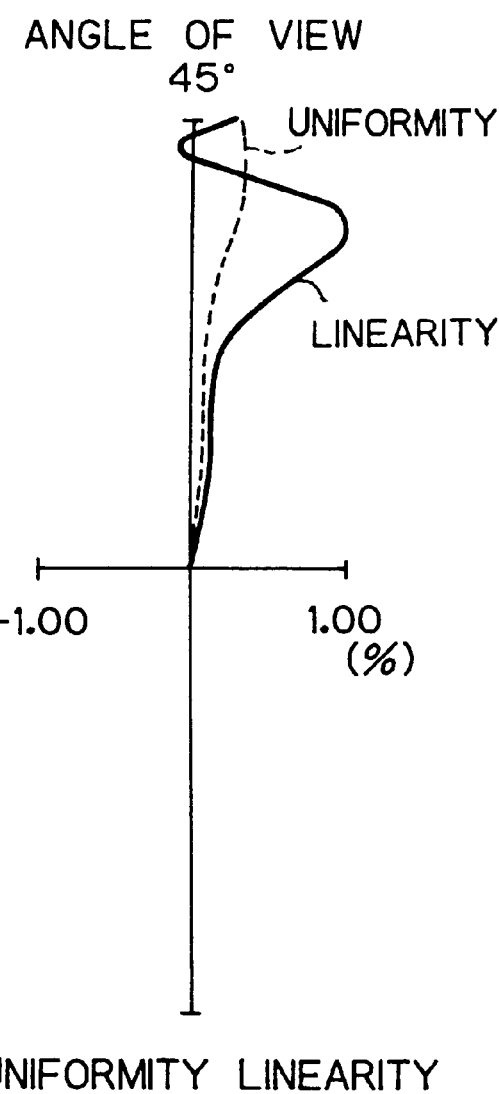

W=216, L=174.9, S=∞ (beam coupled by the coupling lens 12 is a parallel beam)
S(0)=29.887
coaxial nonspherical surface d(0)=12.364 n=1.53664
special toric surface l(0)=132.649
surface facing polarizer: coaxial nonspherical surface shape appearing when a nonarcuate shape is rotated about the optical axis (X axis) and determined by
  R=137.503 K=-92.438,
  A=-1.11822E-6, B=7.28745E-10
  C=-3.20311E-13, D=9.55204E-17
surface facing surface 20: special toric surface
  X2(Y) (nonarcuate shape)
  R=-154.248, K=5.36873,
  A=-2.51300E-6, B=1.95625E-9,
  C=-1.18490E-12, D=3.38272E-16,
  in $r_{s2}(Y) = a + bY^2 + cY^4 + dY^6 + eY^8 + fY^{10}$
    a=-17.0750, b=-4.7190E-3
    c=1.1918E-5, d=-2.3684E-8 e=2.2979E-11, f=−8.0723E-15
in condition (1): W/L ≈1.23
in condition (2): $(W/L)^2 \cdot (L/d_1)$=21.6
FIG. 5 shows field curvatures, uniform scanning characteristic and linearity relating to Example 2.

Example 3

W=216, L=174.9, S=−387.690 (beam coupled by the coupling lens 12 is a weak divergent beam)
S(0)=22.381
coaxial nonspherical surface d(0)=10.000 n=1.53664
special toric surface l(0)=142.519
surface facing polarizer: coaxial nonspherical surface shape appearing when a nonarcuate shape is rotated about the optical axis (X) and determined by
R=108.503, K=−56.32541,
A=−3.46610E-6, B=1.98195E-9
C=−1.32194E-13, D=5.00528E-17
surface facing surface 20: special toric surface
$S_2(Y)$ (nonarcuate shape)
R=−121.259, K=4.91312,
A=−3.24924E-6, B=1.44308E-9,
C=−1.89357E-12, D=1.43613E-15,
in $r_{s2}(Y)=a+bY^2+cY^4+dY^6+eY^8+fY^{10}$
a=−13.9150, b=−6.6641E-3,
c=1.0956E-5, d=−6.2958E-9,
e=3.4232E-12, f=−3.6141E-15
in condition (1): W/L≈1.23
in condition (2): $(W/L)^2 \cdot (L/d_1)$=26.7
FIG. 6 shows field curvatures, uniform scanning characteristic and linearity relating to Example 3.

Example 4

W=216, L=224.939, S=774.830 (beam coupled by the coupling lens 12 is a weak convergent beam)
S(0)=51.669
coaxial nonspherical surface d(0)=10.390 n=1.53664
special toric surface l(0)=162.880
surface facing polarizer: coaxial nonspherical surface shape appearing when a nonarcuate shape is rotated about the optical axis (X axis) and determined by
R=148.864, K=5.4534,
A=−7.09267E-7, B=−2.21975E-10,
C=6.07139E-14, D=−8.33979E-18
surface facing surface 20: special toric surface
$X_2(Y)$ (nonarcuate shape)
R=−562.372, K=−462.3035,
A=−4.60398E-7, B=−2.89720E-11.
C=−5.93656E-14, D=1.75926E-17
in $r_{s2}(Y)=a+bY^2+cY^4+dY^6+eY^8+fY^{10}$
a=−26.3310, b=−5.2874E-3
c=1.9092E-6, d=−3.4661E-10,
e=8.6372E-13, f=−3.6498E-16
in condition (1): W/L≈0.96
in condition (2): $(W/L)^2 \cdot (L/d_1)$=20.0
FIG. 7 shows field curvatures, uniform scanning characteristic and linearity relating to Example 4.

Example 5

W=216, L=175.201, S=−375.922 (beam coupled by the coupling lens 12 is a weak divergent beam)
S(0)=22.274
nonarcuate toric surface d(0)=10.0 n=1.53664
special toric surface l(0)=142.927
surface facing polarizer: nonarcuate toric surface
$X_1(Y)$ (nonarcuate shape)
R=107.1, K=−60.196,
A=−3.5107E-6, B=2.0684E-9
C=−8.9722E-14, D=1.1672E-17
$r_{si}(Y)$
$r_{s1}(0)$=−60.0
surface facing surface 20: special toric surface
$X_2(Y)$ (nonarcuate shape)
R=−119.99. K=4.78039,
A=−3.4156E-6, B=1.5437E-9,
C=−1.8765E-12, D=1.4637E-15,
in $r_{s2}(Y)=a+bY^2+cY^4+dY^6+eY^8+fY^{10}$
a=−11.4579, b=−4.3509E-3,
c=8.8457E-6, d=−6.9161E-9
e=5.3831E-12, f=3.2985E-15
in condition (1): W/L≈1.23
in condition (2): $(W/L)^2 \cdot (L/d_1)$=26.6
FIG. 8 shows field curvatures, uniform scanning characteristic and linearity relating to Example 5.

Example 6

W=216, L=175.201, S=−375.922 (beam coupled by the coupling lens 12 is a weak divergent beam)
S(0)=22.274
special toric surface d(0)=10.0 n=1.53664
special toric surface l(0)=142.927
surface facing polarizer: special toric surface
$X_1(Y)$ (nonarcuate shape)
R=107.1, K=−60.197
A=−3.5107E-6, B=2.0684E-9,
C=−8.9722E-14, D=1.1672E-17
in $r_{s1}(Y)=a+bY^2+cY^4+dY^6+eY^8+fY^{10}+gY^{12}$
a=−22, b=−2.5751E-1,
c=4.49657E-3, d=−4.466449E-5,
e=1.956944E-7, f=−3.87E-10,
g=2.792783E-13
surface facing surface 20: special toric surface
$X_2(Y)$ (nonarcuate shape)
R=−119.11, K=4.78039,
A=−3.4156E-6, B=1.5437E-9
C=−1.8756E-12, D=1.4637E-15
in $r_{s2}(Y)=a+bY^2+cY^4+dY^6+eY^8+fY^{10}+gY^{12}$
a=−9.807, b=−1.662605E-2
c=1.870374E-4, d=−1.27425E-6,
e=4.079722E-9, f=−6.029437E- 12,
g=3.315003E-15
in condition (1): W/L≈1.23
in condition (2): $(W/L)^2 \cdot (L/d_1)$=26.6
S(θ), d(θ), l(θ), $r_{s1}'(Y)$ and $r_{s2}'(Y')$ are listed below.

| θ | 0 | 10 | 20 | 30 | 36 | 40 | 45 |
|---|---|---|---|---|---|---|---|
| S(θ) | 22.274 | 22.689 | 23.997 | 26.399 | 28.509 | 30.261 | 32.924 |
| d(θ) | 10 | 9.876 | 9.452 | 8.551 | 7.635 | 6.793 | 5.386 |
| l(θ) | 142.887 | 144.327 | 148.338 | 154.765 | 159.674 | 163.608 | 168.608 |
| $r_{s1}'$(Y) | −22 | −24.732 | −27.589 | −36.35 | −43.735 | −55.259 | −69.233 |
| $r_{s2}'$(Y') | −9.807 | −10.101 | −10.495 | −11.382 | −12.042 | −12.761 | −13.572 |

B(θ) are calculated by substituting the above data for the right side of P(θ). Then, |β(θ)| and |β(θ)/β(0)| with respect to the polarization angle θ are produced, as listed below.

| θ(°) | 0 | 10 | 20 | 30 | 36 | 40 | 45 |
|---|---|---|---|---|---|---|---|
| Y | 0 | 3.94 | 8.207 | 13.2 | 16.757 | 19.451 | 23.281 |
| |β(θ)| | 4.42 | 4.47 | 4.49 | 4.53 | 4.53 | 4.55 | 4.52 |
| |β(θ)/β(0)| | 1.0 | 1.01 | 1.02 | 1.03 | 1.03 | 1.03 | 1.02 | in condition (3): $|\beta(0)|=4.42$ in condition (4): $|\beta(0)| \leq |\beta(\theta)| \leq 1.03|\beta(0)|$ FIG. 9 shows field curvatures, uniform scanning characteristic and linearity relating to Example 6.

Example 7

W=216, L=174.9, S=554.6 (beam coupled by the coupling lens 12 is a weak convergent beam)

S(0)=38.916 special toric surface d(0)=15.0 n=1.53664 special toric surface l(0)=120.984 surface facing polarizer: special toric surface
 $X_1(Y)$ (nonarcuate shape)
 R=168.191, K=−39.924,
 A=−3.4224E-7, B=2.2729E-13,
 C=8.0109E-15, D=−8.7059E-19
 in $r_{s1}(Y)=a+bY^2+cY^4+dY^6+dY^8+fY^{10}+gY^{12}$
  a=−31, b=−3.26507E-2,
  c=−2.90654E-4, d=5.99426E-7,
  e=−3.979759E-10, f=4.109081E-14,
  g=2.443981E-17 surface facing surface 20: special toric surface
 $X_2(Y)$ (nonarcuate shape)
 R=−188.994, K=−4.83792,
 A=−4.9817E-7, B=7.7236E-12,
 C=−1.6386E-14, D=1.7827E-18
 in $r_{s2}(Y)=a+bY^2+cY^4+dY^6+eY^8+fY^{10}+gY^{12}$
  a=−13.91, b=−2.866184E-3,
  c=−1.21239E-5, d=2.690094E-8
  e=−2.090761E-11, f=6.668513E-15,
  g=−6.734702E-19 in condition (1): W/L≈1.23 in condition (2): $(W/L)^2 \cdot (L/d_1)=17.8$

S(θ), d(θ), l(θ), $r_{s1}'(Y)$ and $r_{s2}'(Y')$ are listed below.

| θ | 0 | 10 | 20 | 30 |
|---|---|---|---|---|
| S(θ) | 38.916 | 39.656 | 42.01 | 46.417 |
| d(θ) | 15 | 14.747 | 13.884 | 12.038 |
| l(θ) | 121.012 | 122.213 | 125.713 | 131.319 |
| $r_{s1}'(Y)$ | −31 | −32.676 | −43.121 | −62.437 |
| $r_{s2}'(Y')$ | −13.91 | −14.145 | −15.21 | −16.769 |

| θ | 36 | 40 | 45 |
|---|---|---|---|
| S(θ) | 50.376 | 53.81 | 58.794 |
| d(θ) | 10.135 | 8.354 | 5.324 |
| l(θ) | 135.629 | 138.898 | 143.746 |
| $r_{s1}'(Y)$ | −69.544 | −84.248 | −101.250 |
| $r_{s2}'(Y')$ | −17.478 | −18.376 | −19.395 |

B(θ) are calculated by substituting the above data for the right side (?) of P(θ). Then, |β(θ)| and |β(θ)/β(0)| with respect to the polarization angle θ are produced, as listed below.

Figure 10A:
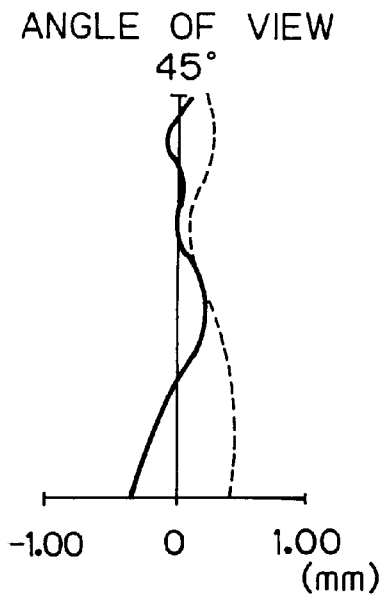
Figure 10B:
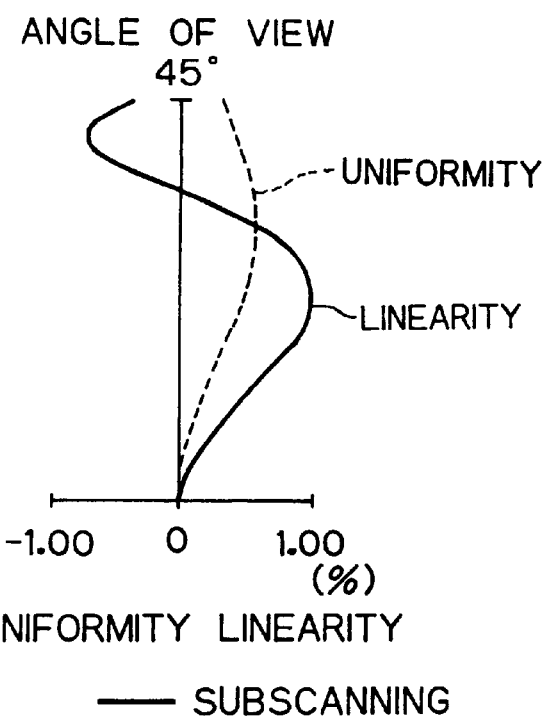

| θ(°) | 0 | 10 | 20 | 30 | 36 | 40 | 45 |
|---|---|---|---|---|---|---|---|
| Y | 0 | 6.886 | 14.368 | 23.208 | 29.610 | 34.524 | 41.573 |
| |β(θ)| | 2.19 | 2.20 | 2.25 | 2.29 | 2.28 | 2.27 | 2.27 |
| |β(θ)/β(0)| | 1.0 | 1.01 | 1.03 | 1.04 | 1.04 | 1.04 | 1.04 | in condition (3): $|\beta(0)|=2.19$ in condition (4): $|\beta(0)| \leq |\beta(\theta)| \leq 1.04|\beta(0)|$ FIG. 10 shows field curvatures, uniform scanning characteristic and linearity relating to Example 7.

Example 8

W=216, L=174.9, S=316.7 (beam coupled by the coupling lens 12 is a weak convergent beam)

S(0)=48.618 special toric surface d(0)=20.0 n=1.53664 special toric surface l(0)=106.282 surface facing polarizer: special toric surface
 $X_1(Y)$ (nonarcuate shape)
 R=200.224, K=−30.5827,
 A=−1.5926E-7, B=2.2729E-13,
 C=8.0109E-15, D=−3.98579E-19
 in $r_{s1}(Y)=a+bY^2+cY^4+dY^6+dY^8+fY^{10}+gY^{12}$
  a=−30, b=1.521146E-2,
  c=−6.399798E-5, d=1.166608E-7,
  e=−9.651438E-11, f=3.652588E-14,
  g=−5.073881E-18 surface facing surface 20: special toric surface
 $X_2(Y)$ (nonarcuate shape)
 R=−224.092, K=1.19901,
 A=−3.2013E-7, B=7.0624E-12,
 C=−9.2418E-15, D=1.9593E-18
 in $r_{s2}(Y)=a+bY^2+cY^4+dY^6+eY^8+fY^{10}+gY^{12}$
  a=−15.32, b=1.12584E-3,
  c=−3.490667E-6, d=5.91427E-9
  e=−4.057836E-12, f=1.284796E-15,
  g=−1.500234E-19

S(θ), d(θ), l(θ), $r_{s1}'(Y)$ and $r_{s2}'(Y')$ are listed below.

| θ | 0 | 10 | 20 | 30 | 36 | 40 | 45 |
|---|---|---|---|---|---|---|---|
| S(θ) | 48.618 | 49.552 | 52.533 | 58.152 | 63.255 | 67.611 | 74.444 |
| d(θ) | 20 | 19.662 | 18.494 | 15.956 | 13.296 | 10.774 | 6.411 |
| l(θ) | 106.282 | 107.376 | 110.608 | 115.846 | 119.932 | 123.124 | 127.823 |
| $r_{s1}'(Y)$ | −30.0 | −28.769 | −27.175 | −24.561 | −22.426 | −19.745 | −13.291 |
| $r_{s2}'(Y')$ | −15.316 | −15.220 | −15.123 | −14.736 | −14.155 | −13.233 | −10.366 |

B(θ) are calculated by substituting the above data for the right side of P(θ). Then, |β(θ)| and |β(θ)/β(0)| with respect to the polarization angle θ are produced, as listed below.

Figure 11A:
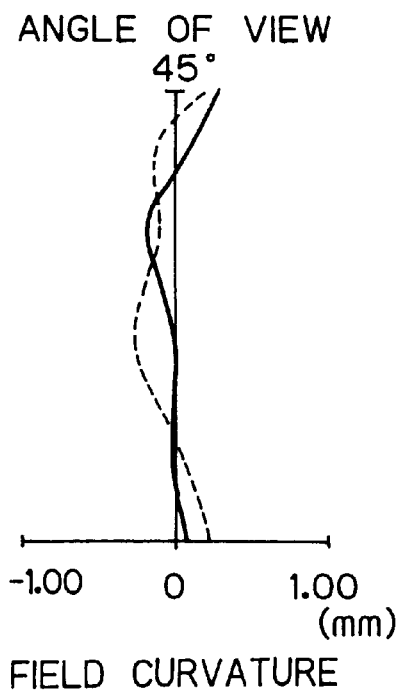
Figure 11B:
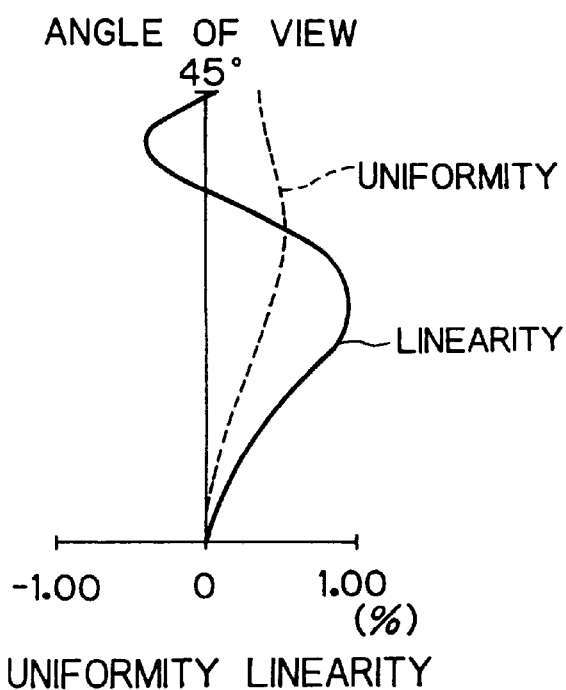

| θ(°) | 0 | 10 | 20 | 30 | 36 | 40 | 45 |
|---|---|---|---|---|---|---|---|
| Y | 0 | 8.605 | 17.967 | 29.076 | 37.180 | 43.459 | 52.640 |
| |β(θ)| | 1.46 | 1.45 | 1.44 | 1.42 | 1.41 | 1.41 | 1.40 |
| |β(θ)/β(0)| | 1.0 | 0.99 | 0.99 | 0.97 | 0.97 | 0.97 | 0.96 | in condition (3): $|\beta(0)|=1.46$ in condition (4): $|\beta(0)| \leq |\beta(\theta)| \leq 0.96|\beta(0)|$ FIG. 11 shows field curvatures, uniform scanning characteristic and linearity relating to Example 8.

Example 9

S=−375.922 (beam coupled by the coupling lens 12 is a weak divergent beam).

S(0)=22.274

$X_1(Y)$, $r_{s1}(Y)$ d(0)=10 n=1.53664

$X_2(Y)$, $r_{s2}(Y)$ l(0)=142.927 surface facing polarizer: nonarcuate toric surface
  $X_1(Y)$ (nonarcuate shape)
  R=107.1, K=−60.197,
  A=−3.5107E-6, B=2.0684E-9,
  C=−8.9722E-14, D=1.1672E-17
  $r_{s1}(Y)$
  $r_{s1}(0)$=−60.0 surface facing surface 20: special toric surface
  $X_2(Y)$ (nonarcuate shape)
  R=−119.99, K=4.78039
  A=−3.4156E-6, B=1.5437E-9,
  C=−1.8765E-12, D=1.4637E-15

As for $R_{s2}(Y)$, $R_{s2}(Y')$ with respect to the polarization angle θ are listed below.

| θ(°) | 0 | 10 | 20 | 30 | 36 | 40 | 45 |
|---|---|---|---|---|---|---|---|
| Y' | 0 | 4.935 | 10.107 | 15.775 | 19.523 | 22.190 | 25.721 |
| $r_{s2}(Y')$ | −11.46 | −11.56 | −11.82 | −12.08 | −12.13 | −12.06 | −11.86 |

By using a polynomial, $r_{s2}(Y')$ may be approximated as:

$$r_{s2}(Y')=a+b\cdot Y'^2+c\cdot Y'^4+d\cdot Y'^6+e\cdot Y'^8+f\cdot Y'^{10}$$

Then, by use of Y' and corresponding $r_{s2}(Y')$ shown above, the coefficients a, b, c, d, e and f are determined by a minimum square method as follows:

a=−11.4579, b=−4.3509E-3, c=8.8457E-6, d=−6.9161E-9, e=5.3831E-12, f=−3.2985E-15

The above approximation was used for the calculation of aberration.

|β(0)|=4.74 holds and satisfies the condition (3).

In this connection, when the power in the direction corresponding to the subscanning direction is assigned to only one surface of the lens 18, |β(0)| is 4.97 and does not satisfy the condition (3).

Figure 12A:
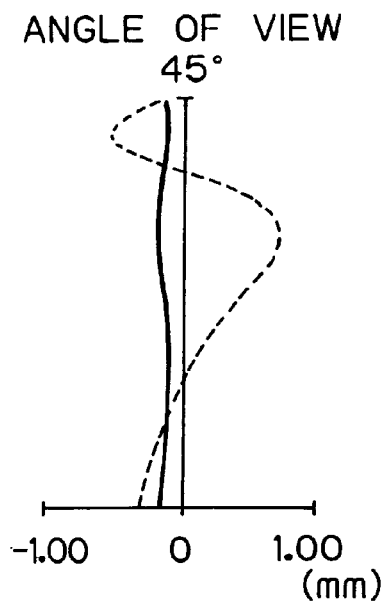
Figure 12B:
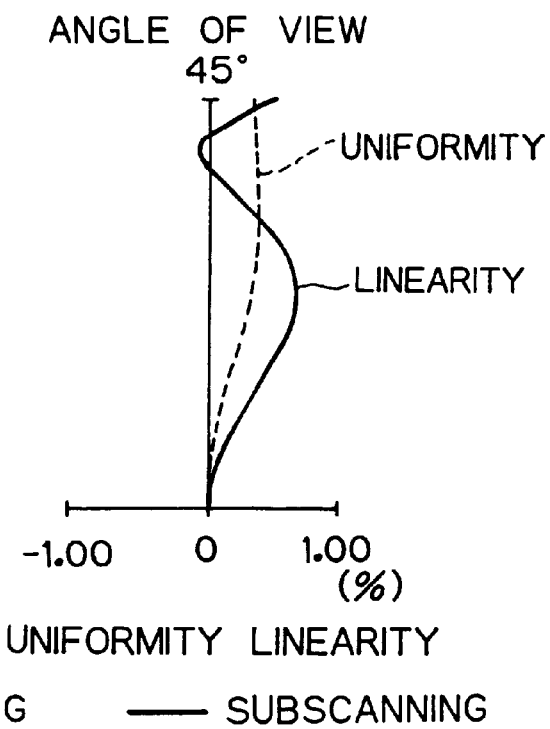

FIG. 12 shows field curvatures, uniform scanning characteristic and linearity relating to Example 9.

The uniform scanning characteristic is defined as:

$$[\{h'(\theta)-h(\theta)\}/h(\theta)]\times 100\ (\%)$$

where h(θ) is the ideal image height for the polarization angle θ(=constant×θ) while h'(θ) is the actual image height.

In FIG. 12, a field curvature indicated by a dashed line and a field curvature indicated by a solid line correspond to the main scanning direction and subscanning direction, respectively.

Example 10

S=−∞ (beam coupled by the coupling lens is a parallel beam)

| $X_1(Y)$, $r_{s1}(Y)$ | S(0) = 51.871 | n = 1.53664 |
|---|---|---|
| $X_2(Y)$, $r_{s2}(Y)$ | d(0) = 21.754 | |
| | l(0) = 149.07 | | surface facing polarizer: nonarcuate toric surface
  $X_1(Y)$ (nonarcuate shape)
  R=461.302, K=−35.937,
  A=−2.205E-7, B=2.732E-11,
  C=−4.9587E-15, D=1.6048E-19
  $r_{s1}(Y)$
  $r_{s1}(0)$=−73.845 surface facing surface 20: special toric surface
  $X_2(Y)$: arcuate shape with R=−97.244

As for $R_{s2}(Y)$, $R_{s2}(Y')$ with respect to the polarization angle θ are listed below.

| θ(°) | 0 | 6 | 14 | 26 | 32 | 36 | 41 |
|---|---|---|---|---|---|---|---|
| Y' | 0 | 6.831 | 16.005 | 30.152 | 37.565 | 42.713 | 49.470 |
| $r_{s2}(Y')$ | −20.64 | −20.6 | −20.42 | −19.77 | −19.18 | −18.64 | −17.75 |

By using a polynomial, $r_{s2}(Y')$ may be approximated as:

$$r_{s2}(Y')=a+b\cdot Y'^2+c\cdot Y'^4+d\cdot Y'^6+e\cdot Y'^8+f\cdot Y'^{10}$$

Then, by use of Y' and corresponding $r_{s2}(Y')$ shown above, the coefficients a, b, c, d, e and f are determined by a minimum square method as follows:

a=−20.63952, b=0.82661E-3, c=0.13218E-6, d=0.209082E-10, e=−0.53157E-14, f=−4.71E-19

|β(0)|=2.09 holds and satisfies the condition (3).

Figure 13A:
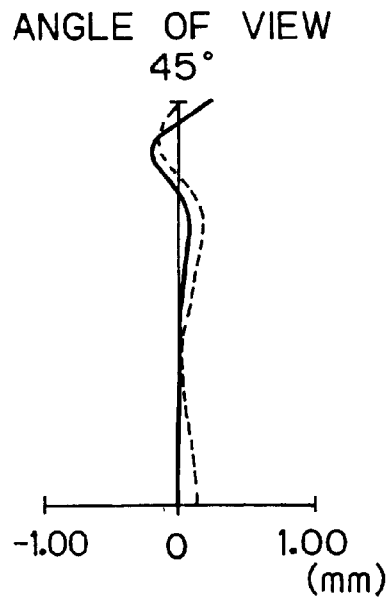
Figure 13B:
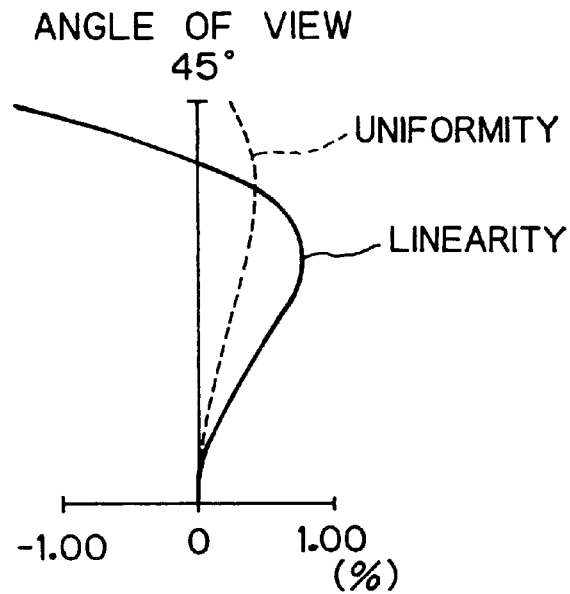

FIG. 13 shows field curvatures, uniform scanning characteristic and linearity relating to Example 10. In this example, because the coupled beam is a parallel beam, the constant mentioned previously in relation to the uniform scanning characteristic is the focal distance fm in the direction corresponding to the main scanning direciton. The uniform scattering characteristic is the usual f-θ characteristic.

Example 11

S=−375.922 (beam coupled by the coupling lens 12 is a weak divergent beam).

| $X_1(Y)$, $r_{s1}(Y)$ | S(0) = 22.274 | n = 1.53664 |
|---|---|---|
| $X_2(Y)$, $r_{s2}(Y)$ | d(0) = 10 | |
| | l(0) = 142.927 | | surface facing polarizer: special toric surface
  $X_1(Y)$ (nonarcuate shape)
  R=107.1, K=−60.197,
  A=−3.5107E-6, B=2.0684E-9,
  C=−8.9722E-14, D=1.1672E-17

The values of $r_{s1}(Y)$ with respect to the polarization angle θ are listed below.

| θ(°)       | 0     | 10     | 20      | 30      | 36      | 40      | 45      |
|------------|-------|--------|---------|---------|---------|---------|---------|
| Y          | 0     | 3.940  | 8.207   | 13.200  | 16.757  | 19.451  | 23.281  |
| $r_{s1}(Y)$| -22.0 | -25.07 | -29.076 | -40.588 | -50.791 | -65.907 | -85.507 | surface facing surface 20: special toric surface
$X_2(Y)$ (nonarcuate shape)
R=-119.99, K=4.78039
A=-3.4156E-6, B=1.5437E-9,
C=-1.8765E-12, D=1.4637E-15
As for $R_{s2}(Y)$, $R_{s2}(Y')$ with respect to the polarization angle θ are listed below.

| θ(°)        | 0      | 10     | 20     | 30     | 36     | 40     | 45     |
|-------------|--------|--------|--------|--------|--------|--------|--------|
| Y'          | 0      | 4.935  | 10.107 | 15.775 | 19.523 | 22.190 | 25.721 |
| $r_{s2}(Y')$| -9.807 | -10.12 | -10.53 | -11.32 | -11.77 | -12.22 | -12.58 |

Let $r_{s1}(Y')$ be approximated as:

$$r_{s1}(Y) = a + b \cdot Y^2 + c \cdot Y^4 + d \cdot Y^6 + e \cdot Y^8 + f \cdot Y^{10} + g \cdot Y^{12}$$

Then, the coefficients a, b, c, d, e and f are determined by a minimum square method as follows:
a=-22. b=-2.5751E-1, c=0.449657,
d=-4.466449E-5, e=1.956944E-7,
f=-3.87E-10, g=2.79283E-13.
Let $r_{s2}(Y')$ be approximated as:

$$r_{s2}(Y) = a' + b' \cdot Y'^2 + c' \cdot Y'^4 + d' \cdot Y'^6 + e' \cdot Y'^8 + f' \cdot Y'^{10} + g' \cdot Y'^{12}$$

Then, the coefficients a', b', c', d', e', f' and g' are determined by a minimum square method as follows:
a'=-9.807, b'=-1.662605E-2, c'=1.870374E-4,
d'=-1.27425E-6, e'=4.079722E-9,
f'=-6.029437E-12, g'=3.315003E-15
S(θ), d(θ), l(θ), $r_{s1}'(Y)$ and $r_{s2}'(Y)$ are listed below.

| θ            | 0       | 10       | 20       | 30      | 36      | 40       | 45       |
|--------------|---------|----------|----------|---------|---------|----------|----------|
| S(θ)         | 22.274  | 22.689   | 23.997   | 26.399  | 28.509  | 30.261   | 32.924   |
| d(θ)         | 10      | 9.876    | 9.452    | 8.551   | 7.635   | 6.793    | 5.386    |
| l(θ)         | 142.887 | 144.327  | 148.338  | 154.765 | 159.674 | 163.608  | 168.608  |
| $r_{s1}'(Y)$ | -22     | -24.732  | -27.589  | -36.35  | -43.735 | -55.259  | -69.233  |
| $r_{s2}'(Y')$| -9.807  | -10.101  | -10.495  | -11.382 | -12.042 | -12.761  | -13.572  |

B(θ) are calculated by substituting the above data for the right side of P(θ). Then, |β(θ)| and |β(θ)/β(0)| with respect to the polarization angle θ are produced, as listed below.

| θ(°)   | 0    | 10   | 20    | 30   | 36     | 40     | 45     |
|--------|------|------|-------|------|--------|--------|--------|
| Y      | 0    | 3.94 | 8.207 | 13.2 | 16.757 | 19.451 | 23.281 |
| |β(θ)| | 4.42 | 4.47 | 4.49  | 4.53 | 4.53   | 4.55   | 4.52   |

-continued

| θ(°)         | 0   | 10   | 20   | 30   | 36   | 40   | 45   |
|--------------|-----|------|------|------|------|------|------|
| |β(θ)/β(0)|  | 1.0 | 1.01 | 1.02 | 1.03 | 1.03 | 1.03 | 1.02 |

|β(0)|=4.24 holds and satisfies the condition (3). |β(θ)| lies between |β(0)| and 1.03|β(0)| and satisfies the condition (4).

FIG. 14 shows field curvatures, uniform scanning characteristic and linearity relating to Example 11. Because the surface of the lens 18 facing the polarizer in Example 11 is identical in shape as the same surface of the lens 18 in Example 9, the field curvature in the main scanning direction, uniform scanning characteristic and linearity of Example 9 also hold.

Example 12

S=554.6 (beam coupled by the coupling lens 12 is a weak convergent beam).

|                      |                                |
|----------------------|--------------------------------|
| $X_1(Y), r_{s1}(Y)$  | S(0) = 38.916                  |
|                      | d(0) = 15    n = 1.53664       |
| $X_2(Y), r_{s2}(Y)$  | l(0) = 120.984                 | surface facing polarizer: special toric surface
$X_1(Y)$ (nonarcuate shape)
R=168.191, K=-39.924,
A=-3.4224E-7, B=2.2792E-13,
C=8.0209E-15, D=-8.7059E-19
The values of $r_{s1}(Y)$ with respect to the polarization angle θ are listed below.

| θ(°)        | 0     | 10     | 20     | 30     | 36     | 40      | 45      |
|-------------|-------|--------|--------|--------|--------|---------|---------|
| Y           | 0     | 6.886  | 14.368 | 23.208 | 29.610 | 34.524  | 41.574  |
| $r_{s1}(Y)$ | -31.0 | -33.14 | -45.56 | -70.28 | -81.84 | -102.13 | -126.96 | surface facing surface 20: special toric surface
$X_2(Y)$ (nonarcuate shape)
R=-188.994, K=-4.83793
A=-4.9817E-7, B=7.7236E-12,
C=-1.6386E-14, D=1.7827E-18
As for $R_{s2}(Y)$, $R_{s2}(Y')$ with respect to the polarization angle θ are listed below.

| θ(°)         | 0      | 10     | 20     | 30     | 36     | 40     | 45     |
|--------------|--------|--------|--------|--------|--------|--------|--------|
| Y'           | 0      | 8.348  | 17.093 | 26.710 | 33.136 | 37.760 | 43.915 |
| $r_{s2}(Y')$ | -13.91 | -14.16 | -15.25 | -16.63 | -16.99 | -17.44 | -17.54 |

Let $r_{s2}(Y')$ be approximated as:

$$r_{s2}(Y) = a' + b' \cdot Y'^2 + c' \cdot Y'^4 + d' \cdot Y'^6 + e' \cdot Y'^8 + f' \cdot Y'^{10} + g' \cdot Y'^{12}$$

Then, the coefficients a', b', c', d', e', f' and g' are determined by a minimum square method as follows:
a'=-13.91, b'=-2.866184E-3, c'=-1.21239E-5,
d'=2.690094E-8, e'=-2.090761E-11,
f'=6.668513E-15, g'=-6.73470E-19

$S(\theta)$, $d(\theta)$, $l(\theta)$, $r_{s1}'(Y)$ and $r_{s2}'(Y')$ are listed below.

| θ | 0 | 10 | 20 | 30 | 36 | 40 | 45 |
|---|---|---|---|---|---|---|---|
| $S(\theta)$ | 38.916 | 39.656 | 42.01 | 46.417 | 50.376 | 53.81 | 58.794 |
| $d(\theta)$ | 15 | 14.747 | 13.884 | 12.038 | 10.135 | 8.354 | 5.324 |
| $l(\theta)$ | 121.012 | 122.213 | 125.713 | 131.319 | 135.829 | 138.898 | 143.746 |
| $r_{s1'}(Y)$ | −31 | −32.676 | −43.121 | −62.437 | −69.544 | −34.248 | −101.250 |
| $r_{s2'}(Y')$ | −13.91 | −14.145 | −15.21 | −16.769 | −17.478 | −13.376 | −19.395 |

$B(\theta)$ are calculated by substituting the above data for the right side of $P(\theta)$. Then, $|\beta(\theta)|$ and $|\beta(\theta)/\beta(0)|$ with respect to the polarization angle $\theta$ are produced, as listed below.

| θ(°) | 0 | 10 | 20 | 30 | 36 | 40 | 45 |
|---|---|---|---|---|---|---|---|
| Y | 0 | 6.886 | 14.368 | 23.208 | 29.610 | 34.524 | 41.573 |
| $|\beta(\theta)|$ | 2.19 | 2.20 | 2.25 | 2.29 | 2.28 | 2.27 | 2.27 |
| $|\beta(\theta)/\beta(0)|$ | 1.0 | 1.01 | 1.03 | 1.04 | 1.04 | 1.04 | 1.04 |

$|\beta(0)|=4.24$ holds and satisfies the condition (3). $|\beta(\theta)|$ lies between $|\beta(0)|$ and $1.04|\beta(0)|$ and satisfies the condition (4).

FIG. 15 shows field curvatures, uniform scanning characteristic and linearity relating to Example 12.

Example 13

$S=316.7$ (beam coupled by the coupling lens 12 is a weak convergent beam).

| | | |
|---|---|---|
| | $S(0) = 48.618$ | |
| $X_1(Y), r_{s1}(Y)$ | $d(0) = 20.0$ | $n = 1.53664$ |
| $X_2(Y), r_{s2}(Y)$ | $l(0) = 106.282$ | | surface facing polarizer: special toric surface
  $X_1(Y)$ (nonarcuate shape)
  $R=200.224$, $K=-30.5827$,
  $A=-1.5926E-7$, $B=-4.0453E-12$,
  $C=6.0017E-15$, $D=-3.9857E-19$ The values of $r_{s1}(Y)$ with respect to the polarization angle $\theta$ are listed below.

| θ(°) | 0 | 10 | 20 | 30 | 36 | 40 | 45 |
|---|---|---|---|---|---|---|---|
| Y | 0 | 8.605 | 17.967 | 29.208 | 37.180 | 43.459 | 52.640 |
| $r_{s1}(Y)$ | −30.0 | −29.18 | −28.76 | −27.74 | −26.56 | −24.18 | −17.02 | surface facing surface 20: special toric surface
  $X_2(Y)$ (nonarcuate shape)
  $R=-224.092$, $K=1.19901$
  $A=-3.2013E-7$, $B=7.0634E-12$,
  $C=-9.2418E-15$, $D=1.9593E-18$ As for $R_{s2}(Y)$, $R_{s2}(Y')$ with respect to the polarization angle $\theta$ are listed below.

| θ(°) | 0 | 10 | 20 | 30 | 36 | 40 | 45 |
|---|---|---|---|---|---|---|---|
| Y' | 0 | 10.583 | 21.558 | 33.647 | 41.714 | 47.523 | 55.334 |
| $r_{s2}(Y')$ | −15.32 | −15.23 | −15.12 | −14.53 | −13.64 | −12.44 | −9.34 |

Let $r_{s2}(Y)$ be approximated as:

$$r_{s2}(Y)=a+b \cdot Y^2+c \cdot Y^4+d \cdot Y^6+e \cdot Y^8+f \cdot Y^{10}+g \cdot Y^{12}$$

Then, the coefficients a, b, c, d, e, f and g are determined by a minimum square method as follows:
  $a=-30$, $b=1.521146E-2$, $c=-6.399798E-5$,
  $d=1.166608E-7$, $e=-9.651438E-11$,
  $f=3.652588E-14$, $g=-5.073881E-18$ Let $r_{s2}(Y')$ be approximated as:

$$r_{s2}(Y')=a'+b' \cdot Y'^2+c' \cdot Y'^4+d' \cdot Y'^6+e' \cdot Y'^8+f' \cdot Y'^{10}+g' \cdot Y'^{12}$$

Then, the coefficients a', b', c', d', e', f' and g' are determined by a minimum square method as follows:
  $a'=-15.32$, $b'=1.12584E-3$, $c'=-3.490667E-6$,
  $d'=5.91427E-9$, $e'=-4.057836E-12$,
  $f'=1.284796E-15$, $g'=-1.500234E-19$ $S(\theta)$, $d(\theta)$, $l(\theta)$, $r_{s1}'(Y)$ and $r_{s2}'(Y')$ are listed below.

| θ | 0 | 10 | 20 | 30 | 36 | 40 | 45 |
|---|---|---|---|---|---|---|---|
| $S(\theta)$ | 48.618 | 49.552 | 52.533 | 58.152 | 63.255 | 67.611 | 74.444 |
| $d(\theta)$ | 20 | 19.662 | 18.494 | 15.956 | 13.296 | 10.774 | 6.411 |
| $l(\theta)$ | 106.282 | 107.376 | 110.608 | 115.846 | 119.932 | 123.124 | 127.823 |
| $r_{s1'}(Y)$ | −30.0 | −28.769 | −27.175 | −24.561 | −22.426 | −19.745 | −13.291 |
| $r_{s2'}(Y')$ | −15.316 | −15.220 | −15.123 | −14.736 | −14.155 | −13.233 | −10.366 |

$B(\theta)$ are calculated by substituting the above data for the right side of $P(\theta)$. Then, $|\beta(\theta)|$ and $|\beta(\theta)/\beta(0)|$ with respect to the polarization angle $\theta$ are produced as listed below.

| θ(°) | 0 | 10 | 20 | 30 | 36 | 40 | 45 |
|---|---|---|---|---|---|---|---|
| Y | 0 | 8.605 | 17.967 | 29.076 | 37.180 | 43.459 | 52.640 |
| $|\beta(\theta)|$ | 1.46 | 1.45 | 1.44 | 1.42 | 1.41 | 1.41 | 1.40 |
| $|\beta(\theta)/\beta(0)|$ | 1.0 | 0.99 | 0.99 | 0.97 | 0.97 | 0.97 | 0.96 |

$|\beta(0)|=1.46$ holds and satisfies the condition (3). $|\beta(\theta)|$ lies between $|\beta(0)|$ and $0.96|\beta(0)|$ and satisfies the condition (4).

FIG. 16 shows field curvatures, uniform scanning characteristic and linearity relating to Example 13

As stated above, the illustrative embodiment has the following advantages.

(1) In an optical scanning device using a simple scanning lens, a broad effective main scanning range and a compact configuration are achieved.

(2) When the above lens is molded out of plastics, sinking, waving and other errors in configuration are effectively obviated so as to enhance accurate configuration.

(3) Limitation on the tolerance of assembly of an optical element in the optical axis direction is reduced.

(4) In the above scanning device, field curvatures and uniform scanning characteristic in the main and subscanning directions are improved.

(5) In the above scanning device, the fluctuation of the diameter of a beam spot in the subscanning direction is effectively reduced.

2nd Embodiment

Figure 17A:
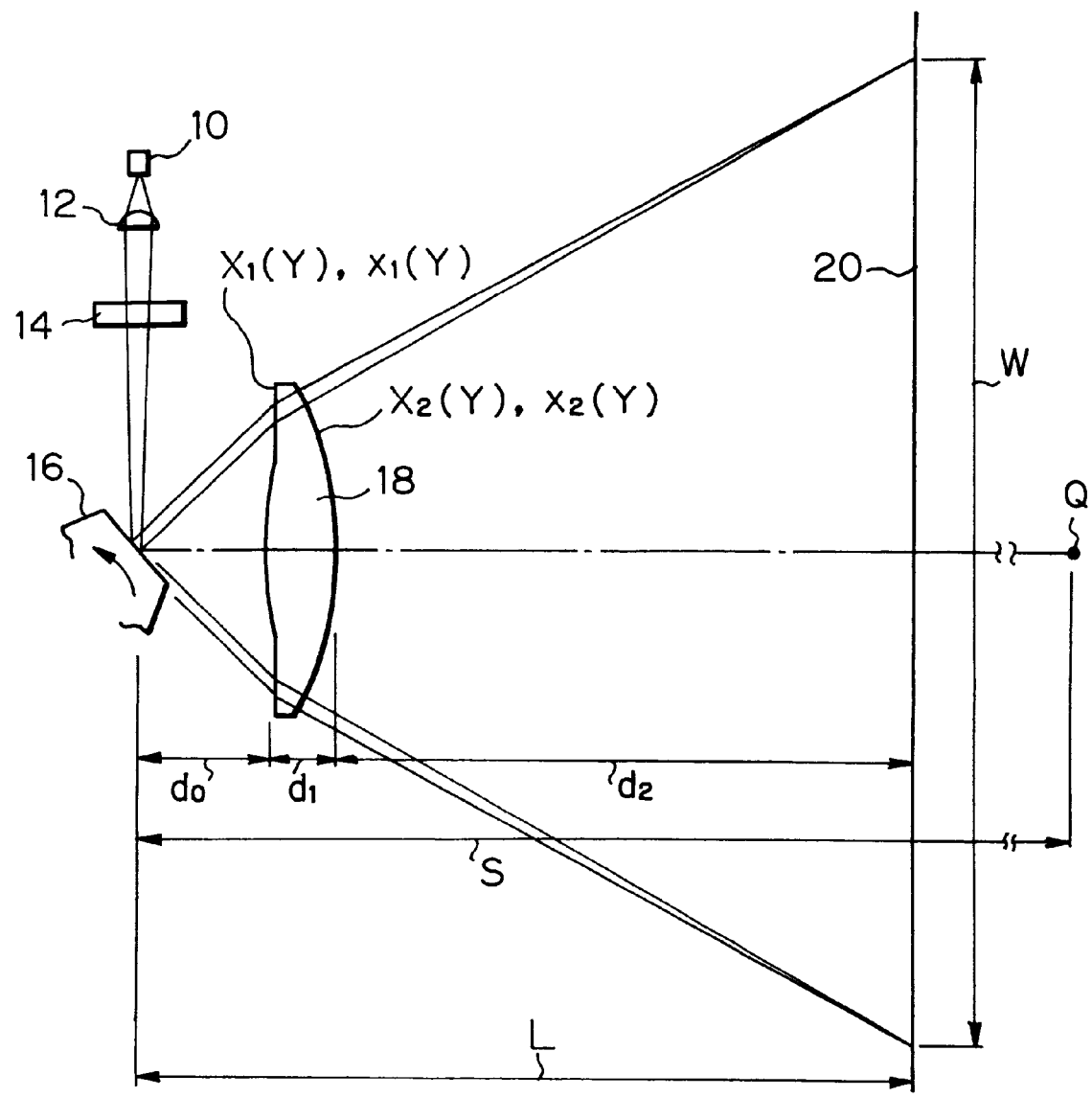
FIGS. 17A–17C show a second embodiment of the optical scanning device in accordance with the present invention.

Referring to FIG. 17A, a second embodiment of the present invention is shown. In FIG. 17A, the same structural elements as the elements shown in FIG. 1A are designated by the same reference numerals.

As shown, a divergent beam issuing from the LC 10 is coupled by the coupling lens 12 which constitute a light source together with the LD 10. The beam from the light source is converged by the convex cylinder lens or line image forming optics 14 in the direction corresponding to the subscanning direction (perpendicular to the sheet surface of FIG. 17A). As a result, the beam forms a line image elongate in the direction corresponding to the main scanning direction on the polarizer or polygonal mirror 16. When the polygonal mirror 16 rotates, it polarizes the incident beam at a uniform angular velocity. The polarized beam is incident to the scanning lens 18. The lens 18 focuses the incident beam in the form of a spot onto the surface 20 to be scanned. As a result, the surface 20 is scanned in the main scanning direction (up-and-down direction in the figure). Usually, a photoconductive element is located at the surface 20 and scanned by the above beam spot to form an image thereon. The effective main scanning width is indicated by letter W. The cylinder lens 14 may be replaced with a concave cylinder lens.

In the illustrative embodiment, the coupling lens 12 functions to transform the beam issuing from the LD 10 to a weak convergent beam. Therefore, in the direction corresponding to the main scanning direction, the polarized beam with a polarization angle of zero degree is focused onto the previously stated natural convergence point Q if the lens 18 is absent. Specifically, assuming a virtual optical path formed by linearly developing an optical path between a light source and a surface to be scanned along an optical axis, the beam coupled by the coupling lens 12 converges to the point Q if the lens 18 is absent on the above virtual optical path.

The distance between the reflection surface 16 and the point Q is labeled S. When the point Q is closer to the surface 20 than to the polarizer, the distance S is greater than zero; the coupled beam is a weak convergent beam. When the point Q is closer to the light source than to the polarizer, the distance S is smaller than zero; the coupled beam is a weak divergent beam. If the coupled beam is a parallel beam, the distance is infinite.

In FIG. 17A, $X_1(Y)$ is representative of the shape of the first surface, as counted from the polarizer side, as seen in the polarization plane (i.e. shape shown in FIG. 17A) while $X_2(Y)$ is representative of the shape of the second surface. Both of these shapes are nonarcuate shapes determined on the basis of R, K, A, B, C, D, . . . of the Eq. (1).

Figure 17B:
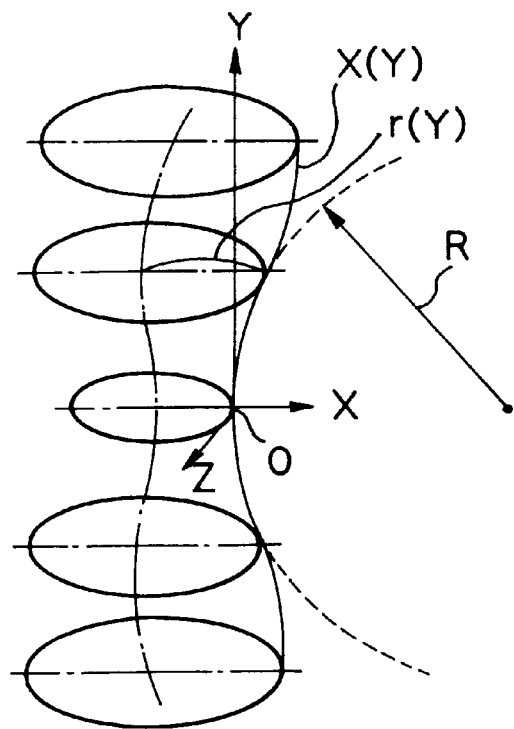
Figure 17C:
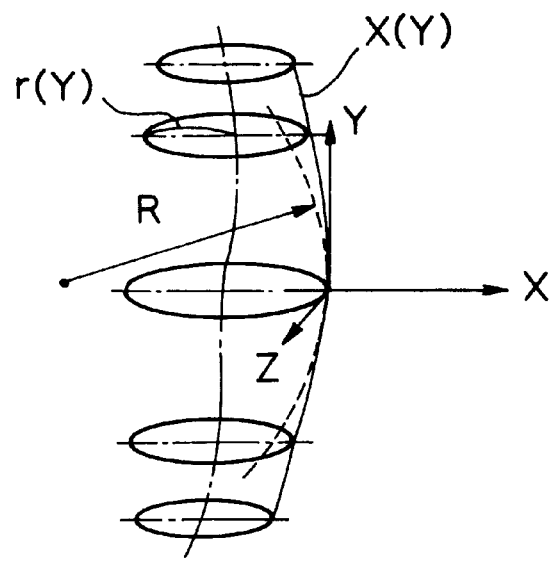
Figure 19:
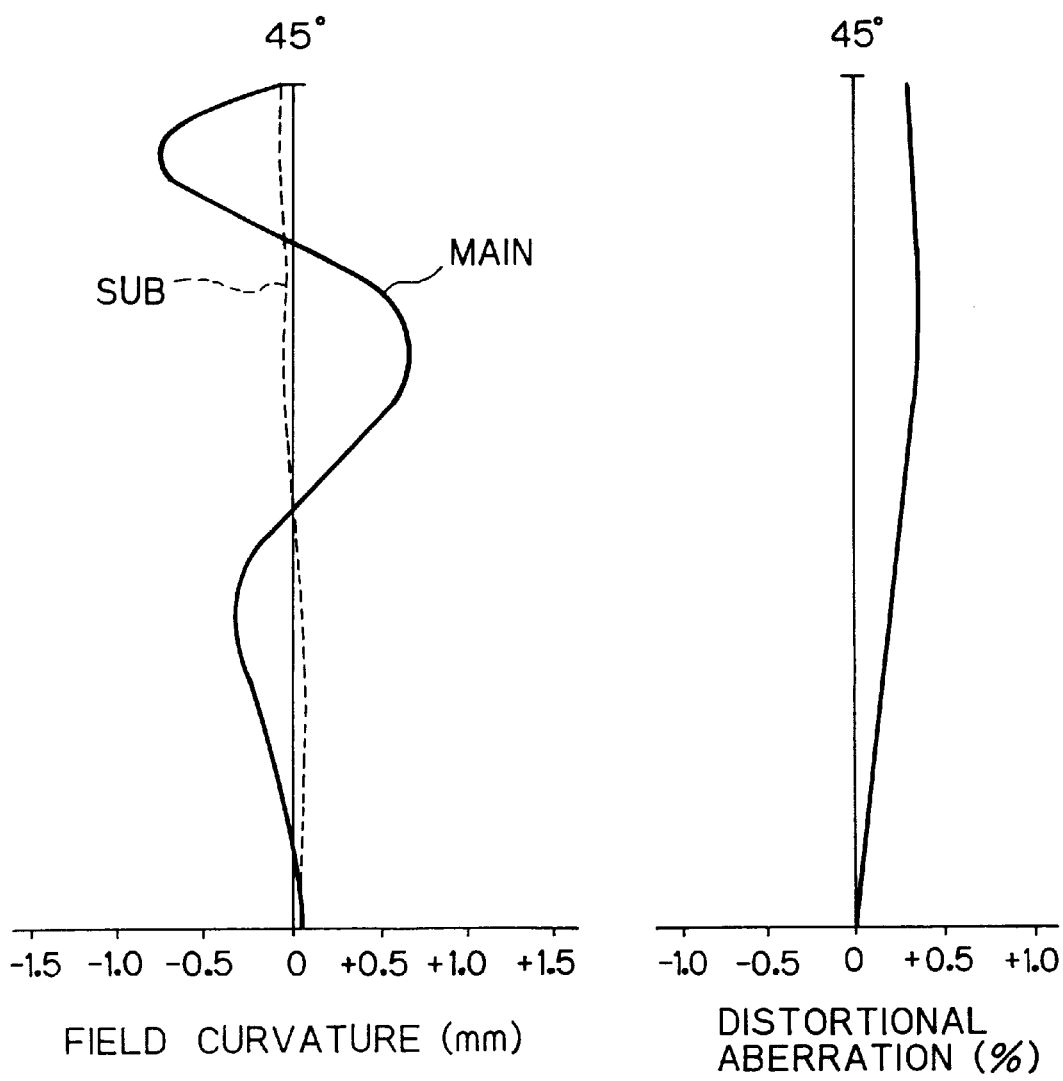
Figure 20:
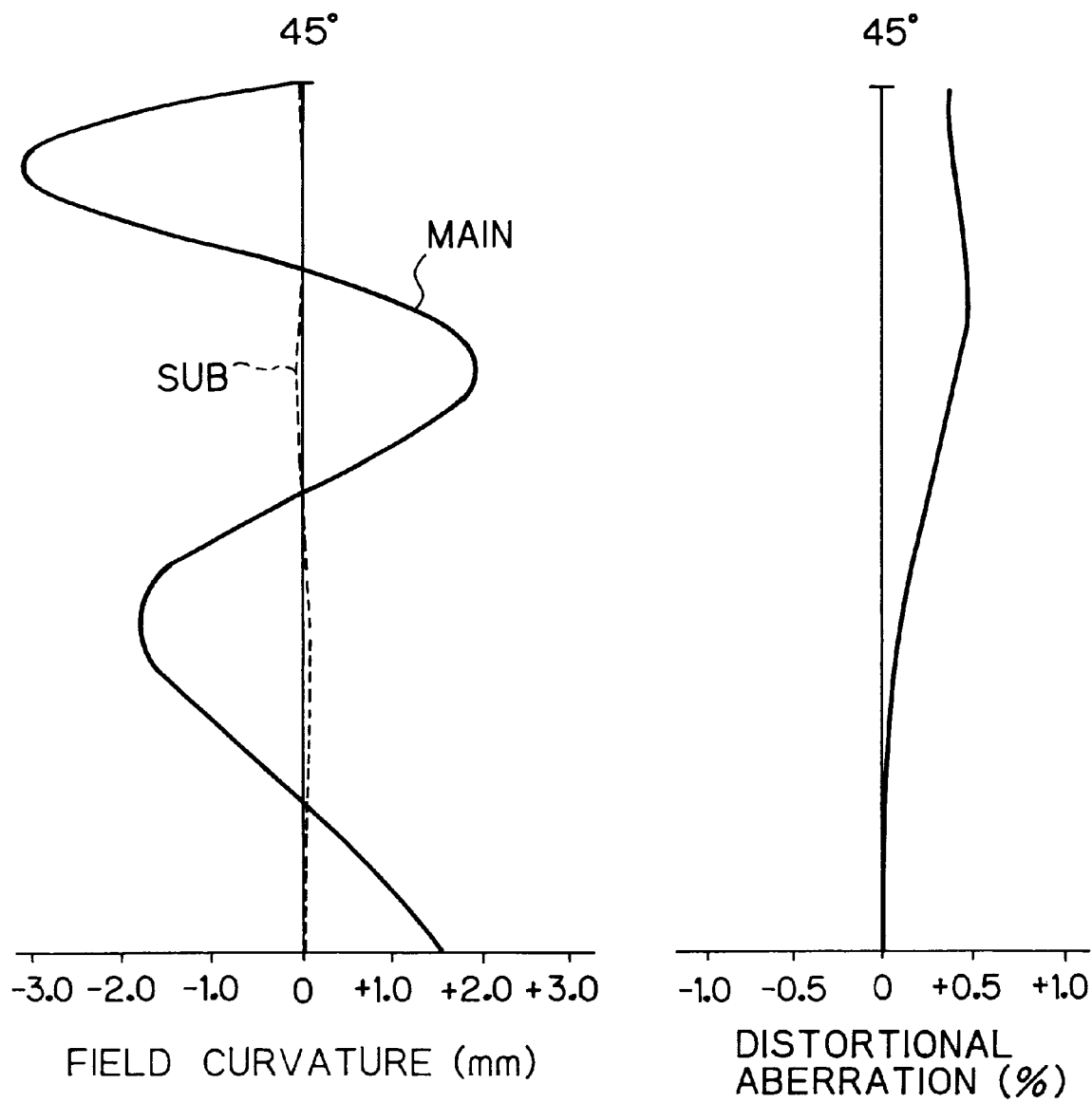
Figure 21:
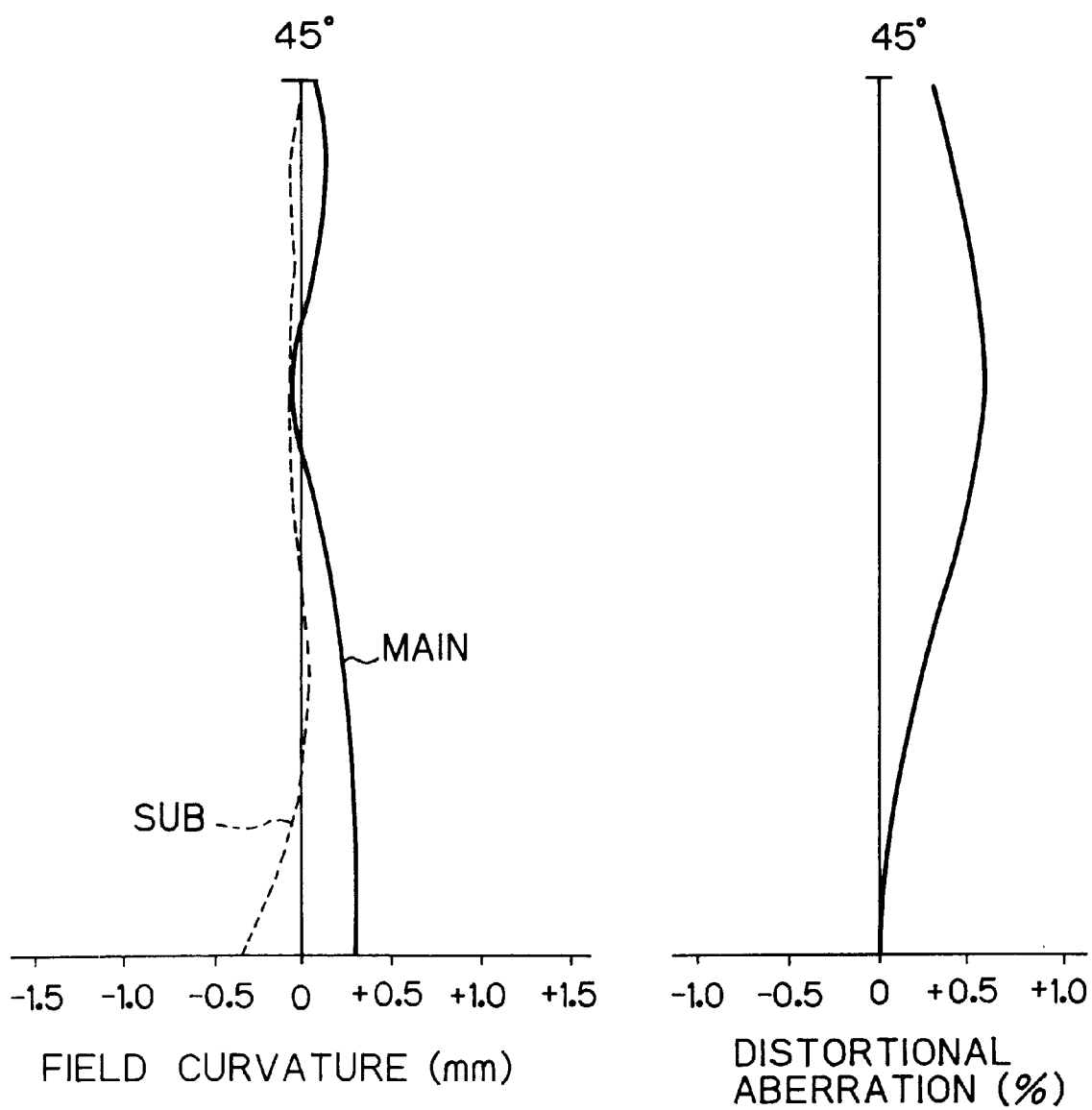
Figure 22:
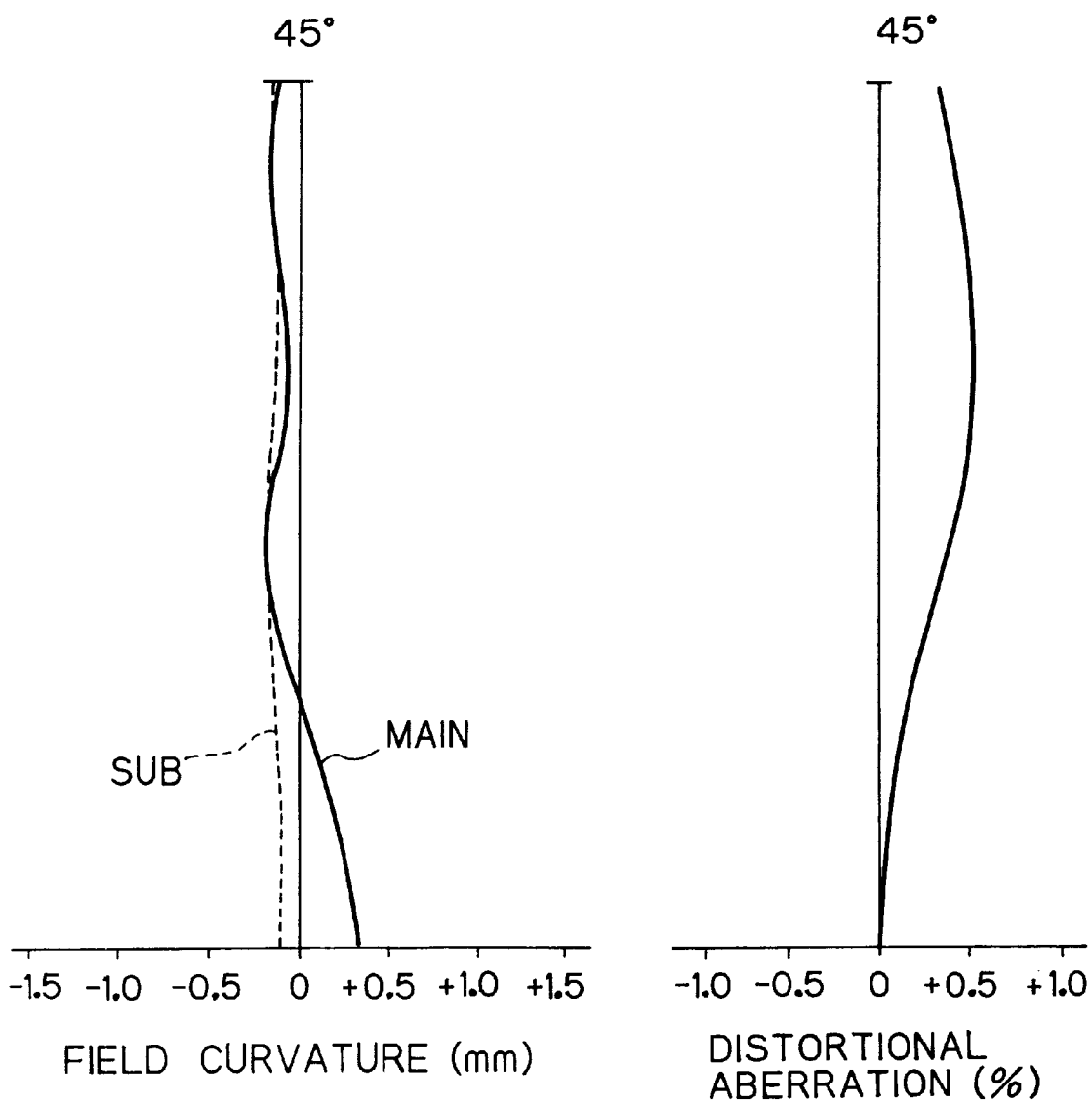
Figure 23:
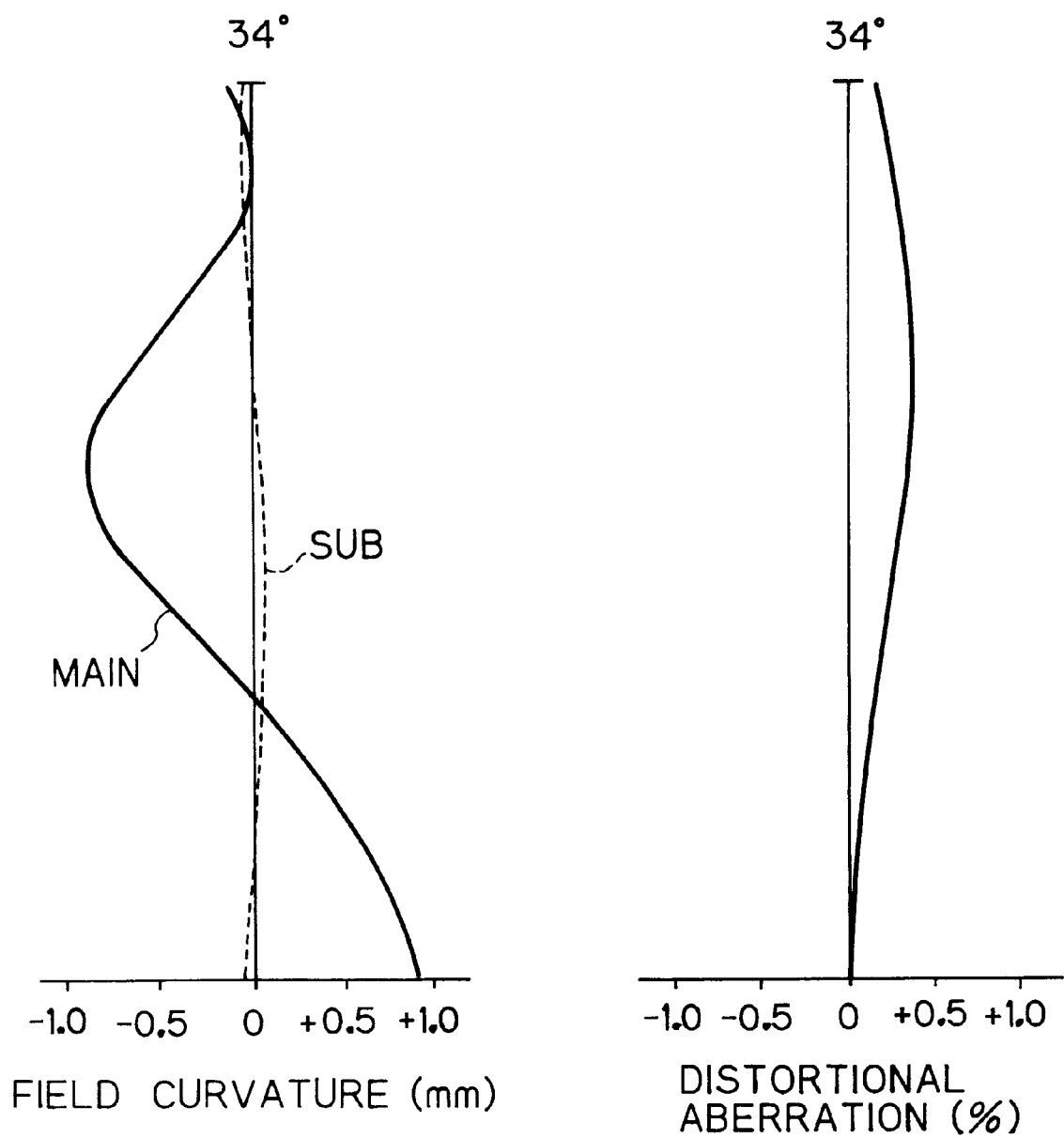
Figure 24:
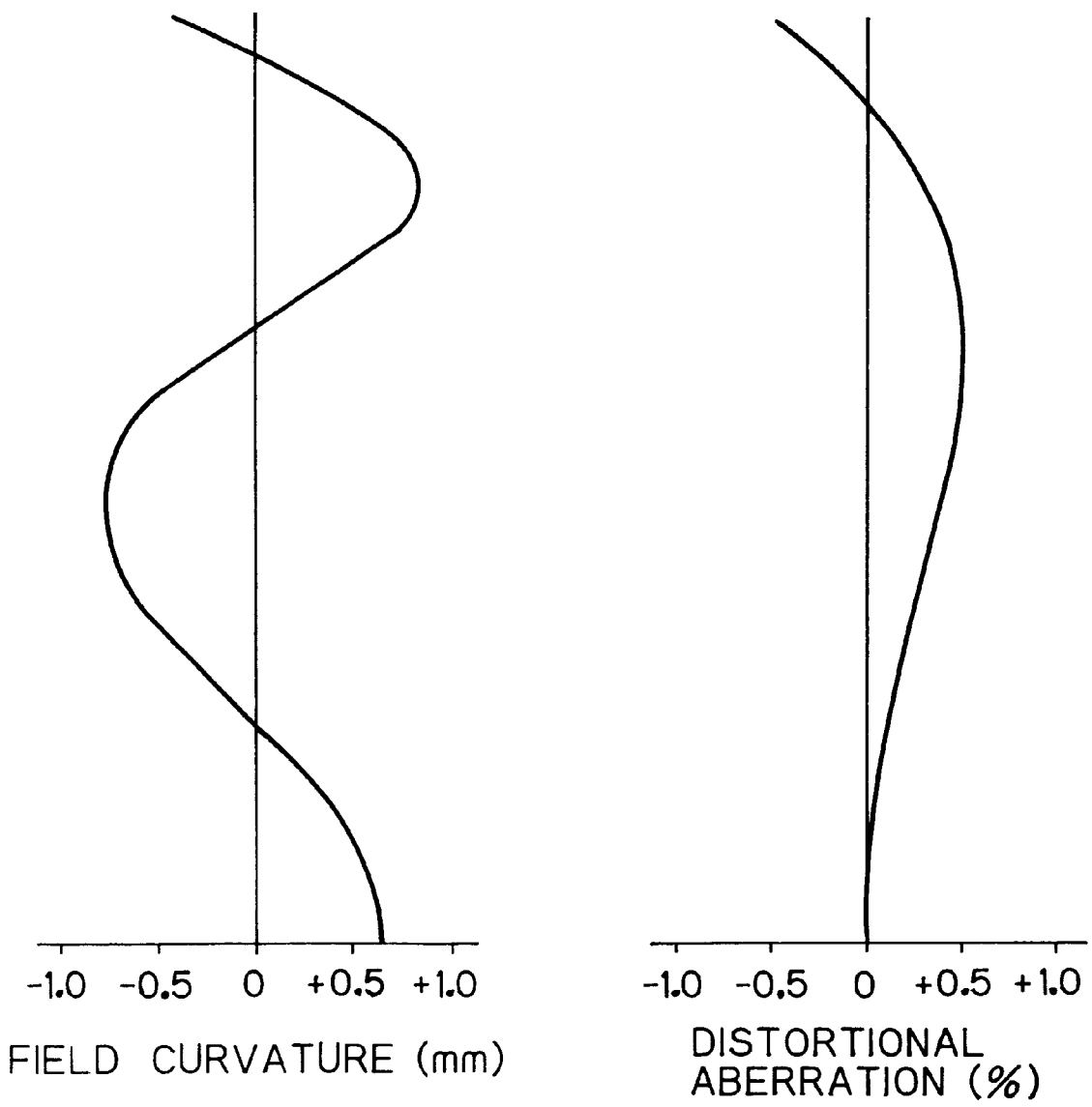
Figure 25:
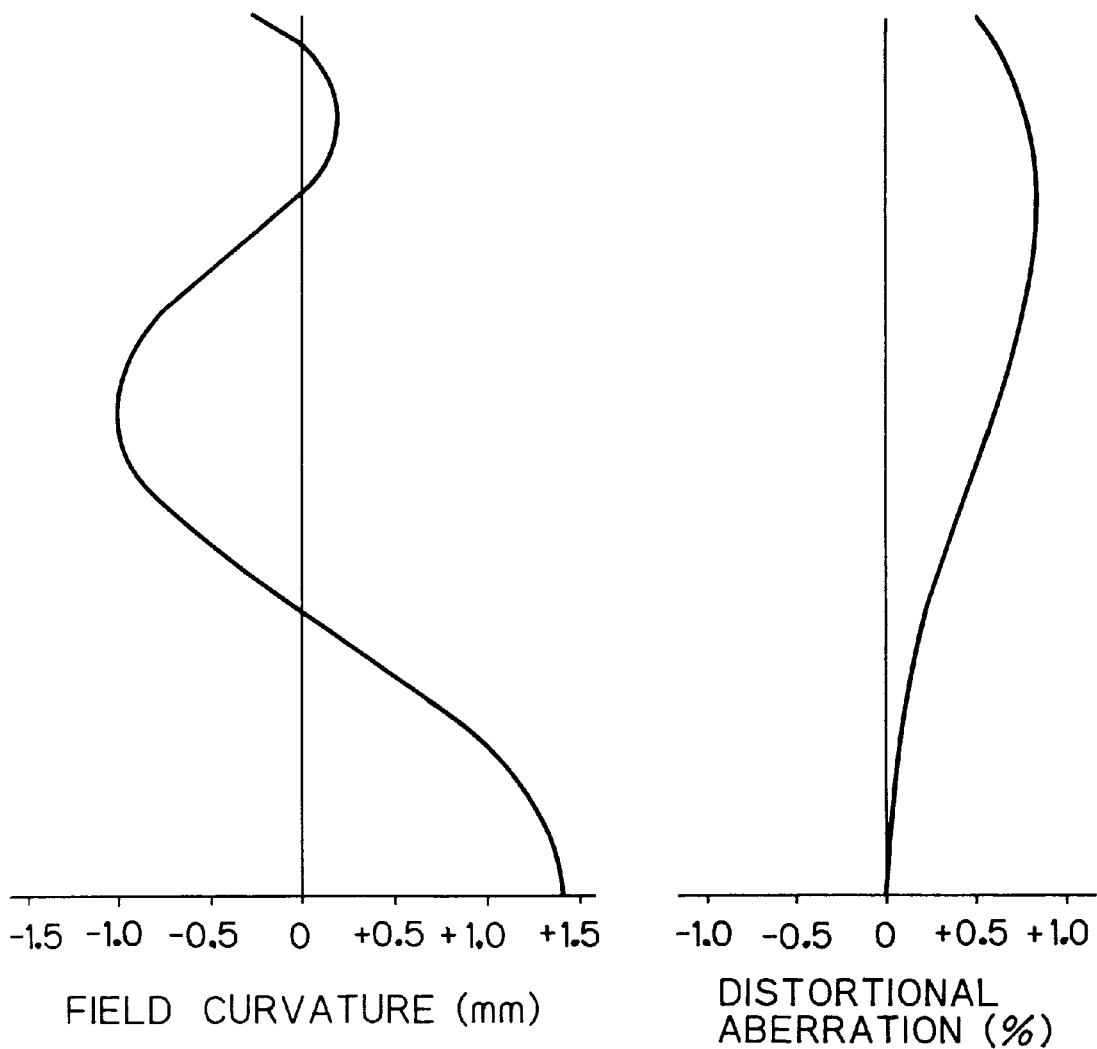
Figure 26:
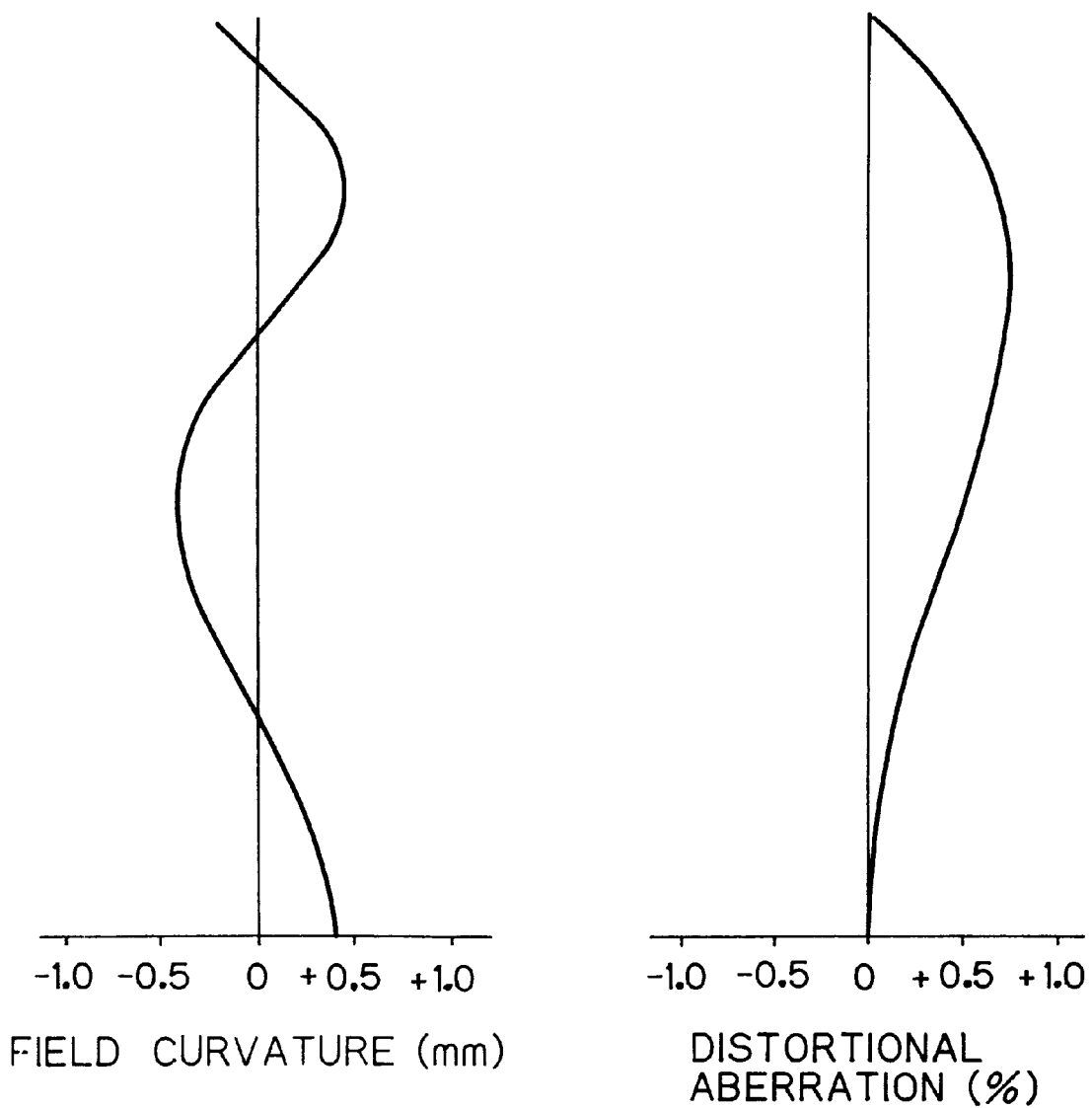
Figure 27:
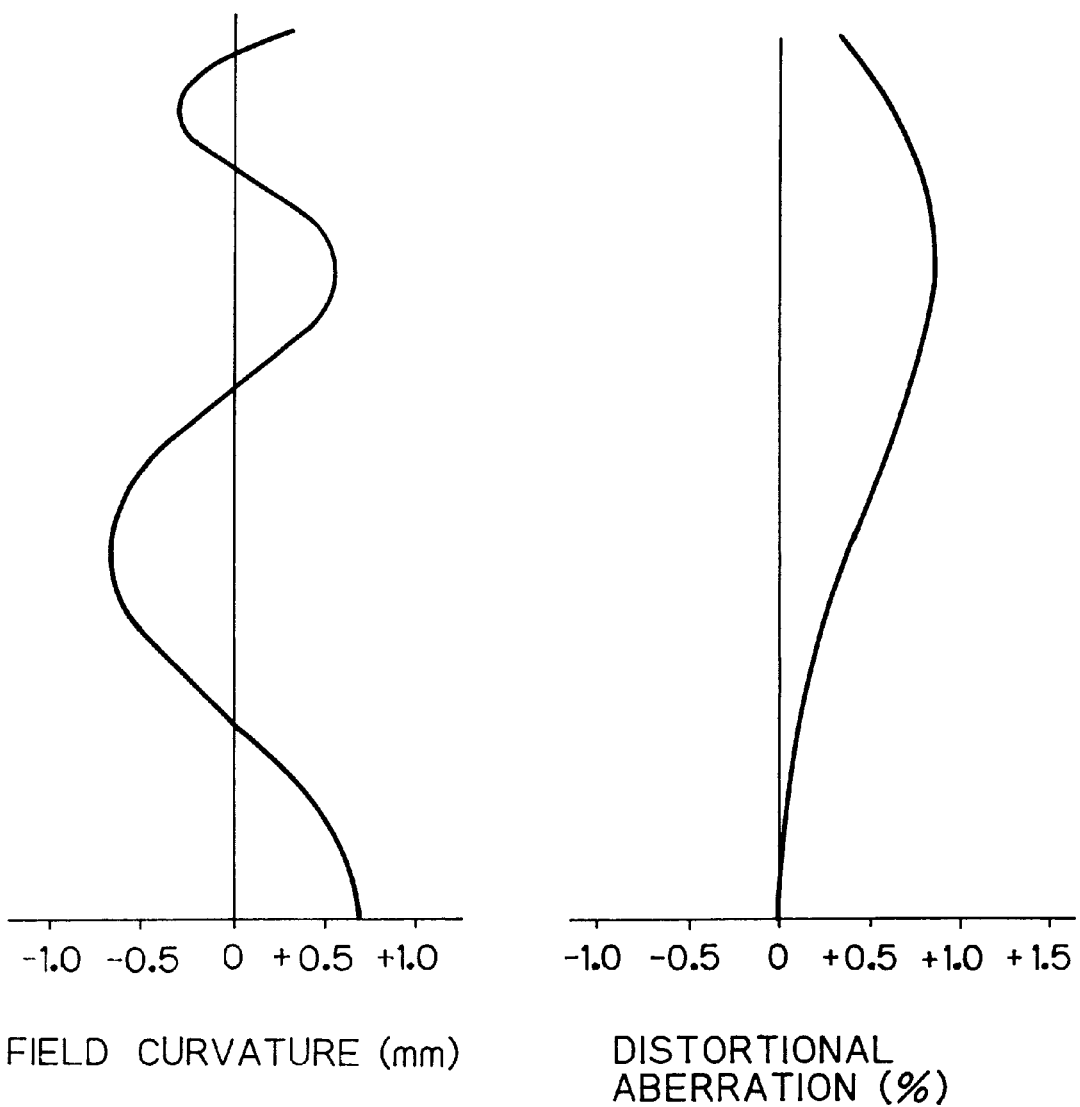
Figure 28:
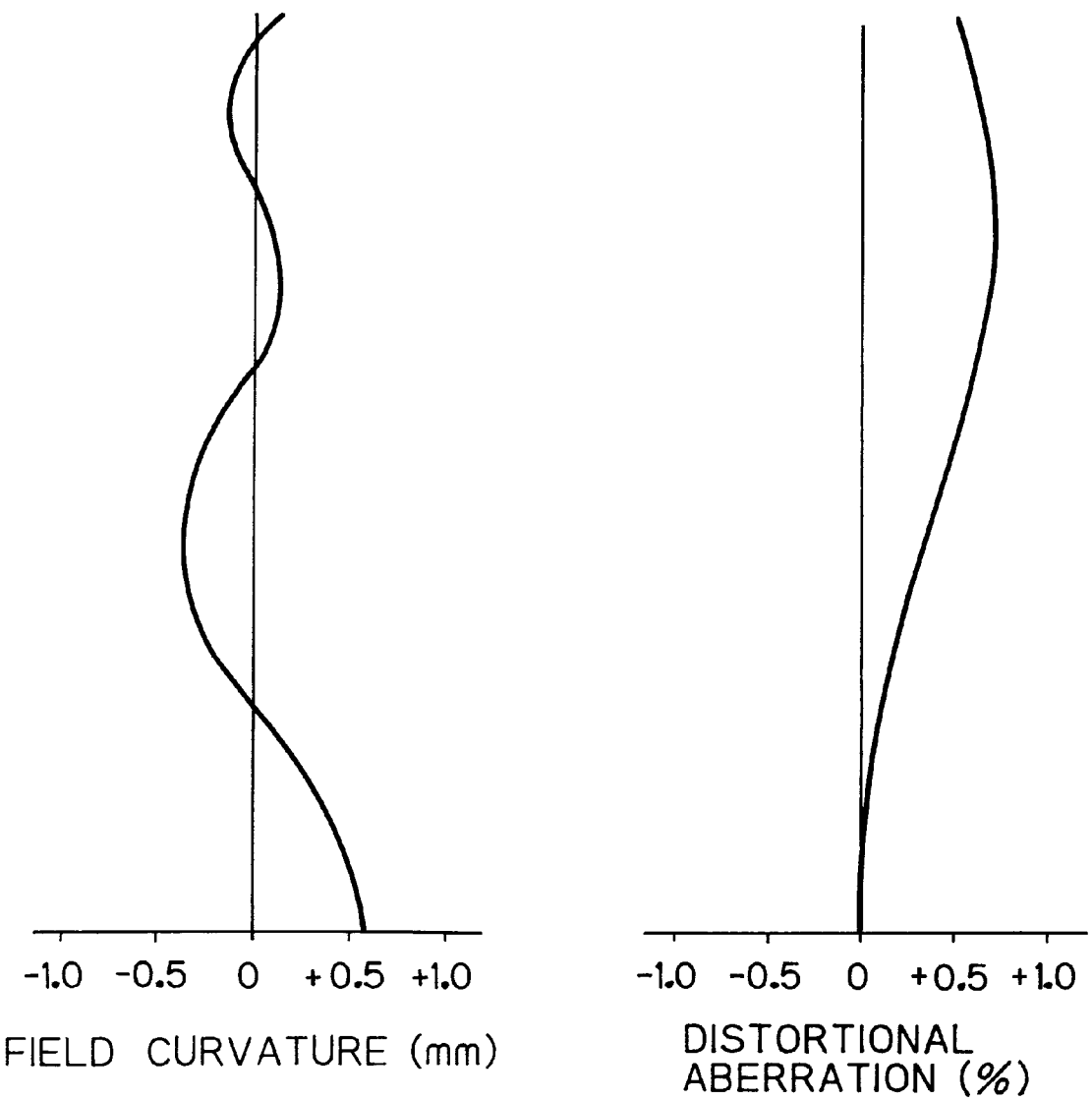
Figure 29:
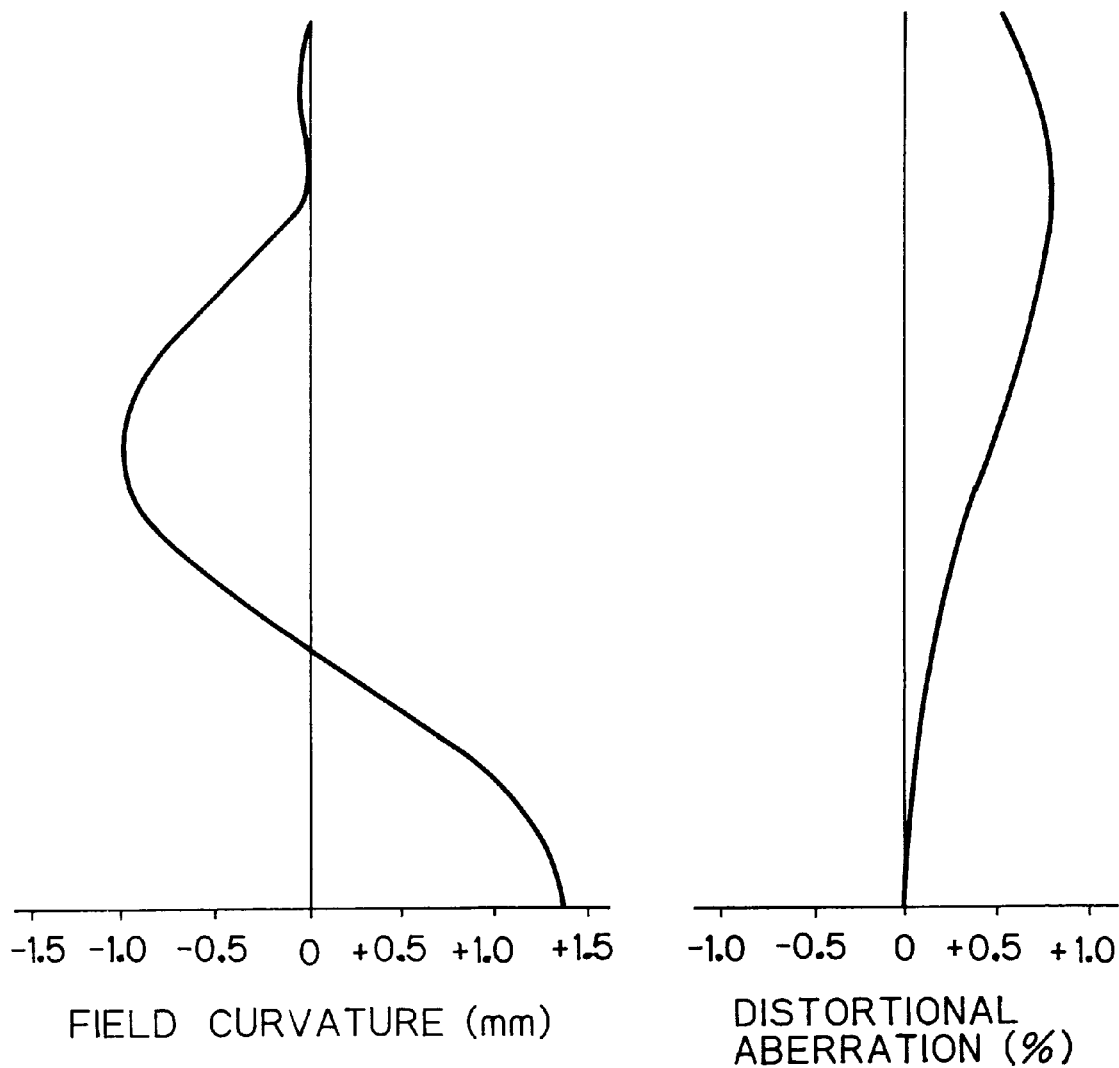
Figure 30:
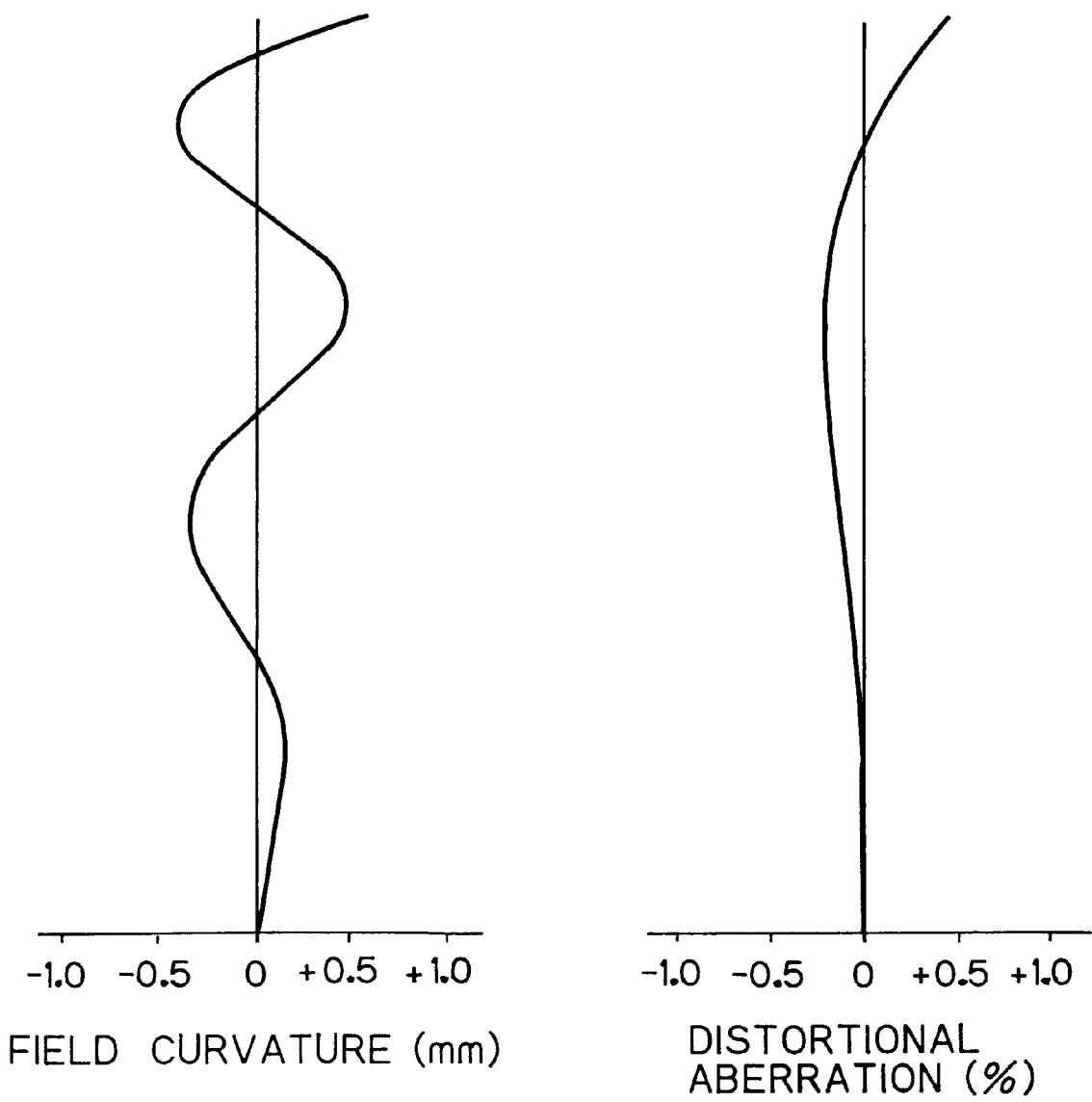
Figure 31:
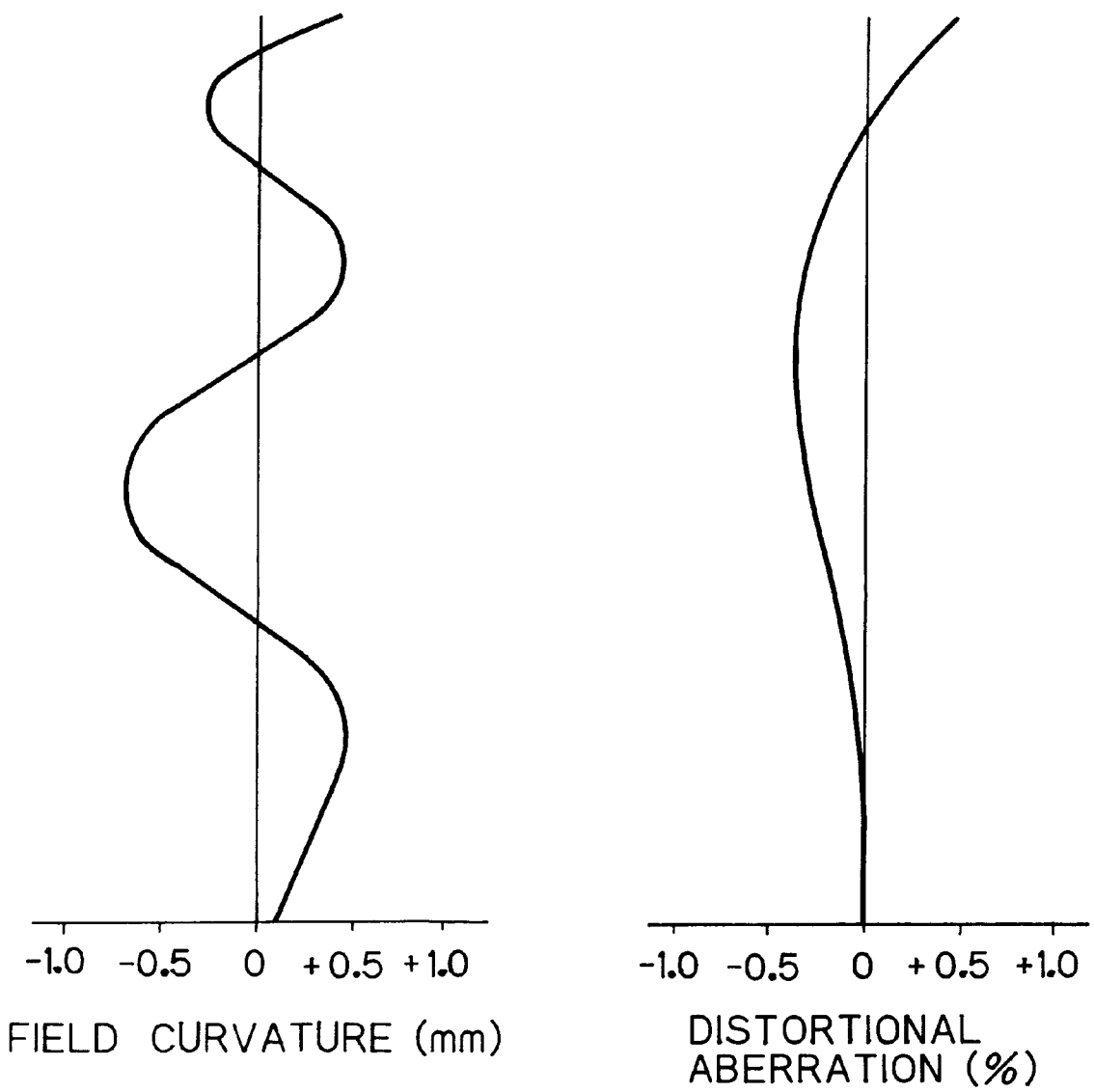
Figure 32:
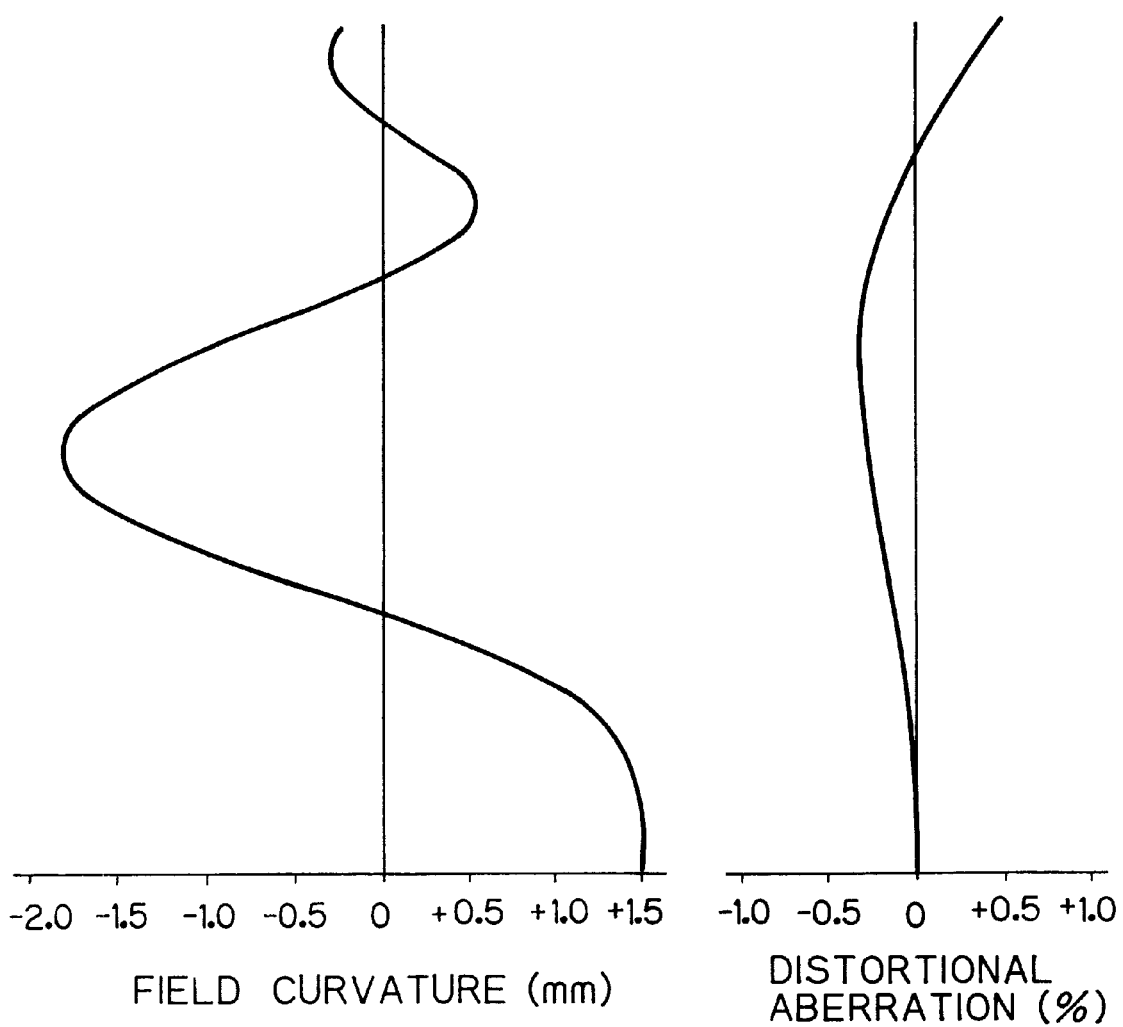

Further, in this embodiment, the lens 18 constitutes an image forming lens itself. Therefore, the lens 18 maintains the image forming position of the line image and the surface 20 in a geometrically conjugate relation in the direction corresponding to the subscanning direction. In addition, the Lens 18 is so configured as to desirably correct the field curvature in the subscanning direction. It follows that the first and/or the second surface of the lens 18, as counted from the polarizer side, has a special toric surface, as shown in FIG. 17B or 17C. Let the shapes of the opposite surfaces of the lens 18 with respect to the direction corresponding to the subscanning direciton (direction perpendicular to the sheet surface of FIG. 17A) be labeled $x_1(Y)$ and $x_2(Y)$, respectively.

In FIGS. 17B and 17C, a curve X(Y) shows the nonarcuate shape (R: paraxial radius of curvature in the Eq. (1)). A special toric surface is a surface in which the radius of curvature r(Y) of a circle of curvature in the direction corresponding to the subscanning direction is changed in accordance with the individual Y coordinate position of a nonarcuate shape in such a manner as to desirably correct the conjugate function and the field curvature in the subscanning direction. Generally, a line connecting the centers of curvature for the radius of curvature r(Y) is generally a curve, as shown in FIGS. 17A and 17C.

In the illustrative embodiment, the nonarcuate shape, as seen in the polarization plane, may be convex toward the polarizer in the paraxial portion of the first lens surface and may be convex toward the surface 20 in the paraxial portion of the second lens surface.

Specific examples of the second embodiment will be described hereinafter. In the examples, as shown in FIG. 17A, the distance between the polarization start point of the polarizer and the incidence surface of the lens 18 is assumed to be $d_0$. The lens 18 is assumed to have a thickness $d_1$ in the optical axis direciton. The surface of the lens 18 facing the surface 20 and the surface 20 are assumed to be spaced a distance $d_2$ from each other. Therefore, L is equal to $d_0+d_1+d_2$. In the polarization plane, the lens 18 is assumed to have a paraxial radius of curvature $R_1$ on the side facing the polarizer and a paraxial radius of curvature $R_2$ on the side facing the surface 20. The refractive index (waveform: 780 mm) of the material of the lens 18 is labeled N. Further, the focal distance in the polarization plane is labeled fm.

The nonarcuate shape $X_1(Y)$ of the first lens surface, as counted from the polarizer side, is determined by giving $R_1$, $K_1$, $A_1$, $B_1$, $C_1$ and $D_1$. The nonarcuate shape $X_2(Y)$ of the second lens surface is determined by giving $R_2$, $K_2$, $A_2$, $B_2$, $C_2$ and $D_2$.

When the first and/or the second lens surface is a special toric surface, a radius of curvature $r_1(\theta)$ and/or $r_2(\theta)$ is given to $x_1(Y)=r_1(Y)$ and/or $x_2(Y)=r_2(Y)$ for each of the polarization angles $\theta$=0, 10, 20, 30, 36, 40 and 45 degrees (or =10, 20, 30 and 34 degrees). It is to be noted that Y and $\theta$ have a relation of $Y=d_0 \cdot \theta$.

In Examples 1–5 to be described, the effective main scanning width W is 216 mm while the effective half-angle of view $\theta$max is 45 degrees. In Example 6, W and $\theta$max are 216 mm and 34 degrees, respectively.

Example 1

In this example, the beam coupled by the coupling lens is a parallel beam.

S=∞, fm=137.503

| i | Ri | di | N |
|---|---|---|---|
| 0 |  | 29.887 |  |
| 1 | 137.503 | 12.364 | 1.53664 |
| 2 | −154.248 | 132.649 |  |

The lens surface facing the polarizer is a coaxial non-spherical surface and symmetrical with respect to the optical axis. Let this be denoted by $X_1(Y)=x_1(Y)$. The lens surface facing the surface 20 is a special toric surface.

$X_1(Y)$:
$R_1=237.503$, $K_1=-92.438$,
$A_1=-1.11822\times10^{-6}$, $B_1=7.28745\times10^{-10}$,
$C_1=-3.20311\times10^{-13}$, $D_1=9.55204\times10^{-17}$ $X_2(Y)$:
$R_2=-154.248$, $K_1=5.36873$,
$A_2=-2.51300\times10^{-6}$, $B_2=1.95625\times10^{-9}$,
$C_2=-1.18490\times10^{-12}$, $D_2=3.38372\times10^{-16}$ $r_2(\theta)$:

| $\theta(°)$ | 0 | 10 | 20 | 30 | 36 | 40 | 45 |
|---|---|---|---|---|---|---|---|
| r2 | −17.083 | −17.243 | −17.658 | −18.116 | −18.463 | −18.607 | −18.803 | fm=137.503
$(W/L)=1.23$, $(W/L)^2\cdot(L/d_1)=21.6$,
$(d_0/d_2)=0.23$

In Examples 2 and 3 to be described, the coupled beam is a weak divergent beam, so that S is smaller than zero. Again, the lens surface facing the polarizer and the surface facing the surface 20 are a coaxial nonspherical surface and a special toric surface, respectively.

Example 2

$S = -391.925$, fm = 108.193

| i | $R_i$ | $d_i$ | N |
|---|---|---|---|
| 0 |  | 22.381 |  |
| 1 | 108.193 | 10.000 | 1.53664 |
| 2 | −121.259 | 142.519 |  |

$X_1(Y)$ ($=x_1(Y)$):
$R_1 = 108.503$, $K_1 = -56.32541$.
$A_1 = -3.46610 \times 10^{-6}$, $B_1 = 1.98195 \times 10^{-9}$,
$C_1 = -1.32194 \times 10^{-13}$, $D_1 = 5.00528 \times 10^{-17}$ $X_2(Y)$:
$R_2 = -121.259$, $K_2 = 4.91312$,
$A_2 = -3.24924 \times 10^{-6}$, $B_2 = 1.44308 \times 10^{-9}$,
$C_2 = -1.89357 \times 10^{-12}$, $D_2 = 1.43613 \times 10^{-15}$ $r_2(\theta)$:

| $\theta(°)$ | 0 | 10 | 20 | 30 | 36 | 40 | 45 |
|---|---|---|---|---|---|---|---|
| $r_2$ | −13.913 | −14.070 | −14.487 | −14.979 | −15.160 | −15.181 | −15.136 |

$(W/L) = 1.23$, $(W/L)^2 \cdot (L/d_1) = 26.7$,
$(d_0/d_2) = 0.16$

Example 3

$S = -796.535$, fm = 125.223

| i | $R_i$ | $d_i$ | N |
|---|---|---|---|
| 0 |  | 25.505 |  |
| 1 | 125.223 | 12.700 | 1.48578 |
| 2 | −114.374 | 136.695 |  |

$X_1(Y)$ ($=x_1(Y)$):
$R_1 = 125.223$, $K_1 = -12.16377$,
$A_1 = -3.41094 \times 10^{-6}$, $B_1 = 1.79586 \times 10^{-9}$, -continued $C_1 = -2.13309 \times 10^{-13}$, $D_1 = 1.22926 \times 10^{-16}$ $X_2(Y)$:
$R_2 = -114.374$, $K_2 = 4.94342$,
$A_2 = -1.42312 \times 10^{-6}$, $B_2 = 1.07576 \times 10^{-9}$,
$C_2 = -1.88925 \times 10^{-12}$, $D_2 = 1.20601 \times 10^{-15}$ $r_2(\theta)$:

| $\theta(°)$ | 0 | 10 | 20 | 30 | 36 | 40 | 45 |
|---|---|---|---|---|---|---|---|
| $r_2$ | −13.246 | −13.396 | −13.815 | −14.395 | −14.717 | −14.871 | −15.096 |

$(W/L) = 1.23$, $(W/L)^2 \cdot (L/d_1) = 21.0$,
$(d_0/d_2) = 0.19$

In Examples 4–6 to be described, the coupled beam is a weak convergent flux, so that S is greater than zero. In Examples 4 and 5, both the surface facing the polarizer and the surface facing the surface 20 are special toric surfaces.

Example 4

$S = 551.935$, fm = 168.191

| i | $R_i$ | $d_i$ | N |
|---|---|---|---|
| 0 |  | 38.916 |  |
| 1 | 168.191 | 15.000 | 1.5370 |
| 2 | −188.994 | 120.984 |  |

$X_1(Y)$:
$R_1 = 168.191$, $K_1 = -39.925$,
$A_1 = -3.42235 \times 10^{-7}$, $B_1 = 2.27288 \times 10^{-13}$,
$C_1 = 8.02089 \times 10^{-15}$, $D_1 = -8.70591 \times 10^{-19}$ $r_1(\theta)$:

| $\theta(°)$ | 0 | 10 | 20 | 30 | 36 | 40 |
|---|---|---|---|---|---|---|
| $r_1$ | −31.000 | −33.138 | −45.561 | −70.282 | −81.839 | −102.128 |

| $\theta(°)$ | 45 |
|---|---|
| $r_1$ | −128.958 |

$X_2(Y)$:
$R_2 = -188.994$, $K_2 = 4.83792$,
$A_2 = -4.98172 \times 10^{-7}$, $B_2 = 7.72365 \times 10^{-12}$,
$C_2 = -1.63863 \times 10^{-14}$, $D_2 = 1.78271 \times 10^{-18}$ $r_2(\theta)$:

| $\theta(°)$ | 0 | 10 | 20 | 30 | 36 | 40 | 45 |
|---|---|---|---|---|---|---|---|
| $r_2$ | −13.910 | −14.163 | −15.245 | −16.629 | −16.990 | −17.441 | −17.540 |

$(W/L) = 1.23$, $(W/L)^2 \cdot (L/d_1) = 17.8$,
$(d_0/d_2) = 0.46$

Example 5

$S = 316.745$, fm = 200.243

| i | $R_i$ | $d_i$ | N |
|---|---|---|---|
| 0 |  | 48.618 |  |
| 1 | 200.244 | 20.000 | 1.537664 |
| 2 | −224.142 | 106.382 |  |

$X_1(Y)$:
$R_1 = 200.244$, $K_1 = -30.283$,
$A_1 = 1.59263 \times 10^{-7}$, $B_1 = -4.04532 \times 10^{-12}$, -continued $C_1 = 6.02170 \times 10^{-15}$, $D_1 = -3.98571 \times 10^{-19}$
$r_1(\theta)$:

| $\theta(°)$ | 0 | 10 | 20 | 30 | 36 | 40 | 45 |
|---|---|---|---|---|---|---|---|
| $r_1$ | −30.000 | −29.182 | −28.764 | −27.743 | −26.556 | −24.175 | −17.022 |

$X_2(Y)$:
$R_2 = -224.142$, $K_2 = 1.1990$,
$A_2 = -3.20125 \times 10^{-7}$, $B_2 = 7.06344 \times 10^{-12}$,
$C_2 = -9.24177 \times 10^{-15}$, $D_2 = 1.95829 \times 10^{-18}$
$r_2(\theta)$:

| $\theta(°)$ | 0 | 10 | 20 | 30 | 36 | 40 | 45 |
|---|---|---|---|---|---|---|---|
| $r_2$ | −15.316 | −15.232 | −15.119 | −14.531 | −13.641 | −12.436 | −9.338 |

$(W/L) = 1.23$, $(W/L)^2 \cdot (L/d_1) = 13.3$,
$(d_0/d_2) = 0.37$

In Example 6 to be described, the lens surface facing the polarizer is a coaxial nonspherical surface, i.e., $X_1(Y)=x_1(Y)$ while the lens surface facing the surface 20 is a special toric surface.

Example 6

$S = +728.528$, $fm = 225.700$

| i | $R_i$ | $d_i$ | N |
|---|---|---|---|
| 0 | | 51.669 | |
| 1 | 148.846 | 10.390 | 1.5241 |
| 2 | −562.372 | 162.880 | |

$X_1(Y) (=x_1(Y))$:
$R_1 = 148.846$, $K_1 = 5.4534$,
$A_1 = -7.09267 \times 10^{-7}$, $B_1 = -2.21975 \times 10^{-10}$,
$C_1 = 6.07139 \times 10^{-14}$, $D_1 = -8.33979 \times 10^{-18}$
$X_2(Y)$:
$R_2 = -562.372$, $K_2 = -462.3035$,
$A_2 = -4.60398 \times 10^{-7}$, $B_2 = -2.89720 \times 10^{-11}$,
$C_2 = -5.93656 \times 10^{-14}$, $D_2 = 1.73926 \times 10^{-17}$
$r_2(\theta)$:

| $\theta(°)$ | 0 | 10 | 20 | 30 | 34 |
|---|---|---|---|---|---|
| $r_2$ | −25.651 | −26.163 | −27.558 | −28.895 | −28.836 |

$(W/L) = 0.96$, $(W/L)^2 \cdot (L/d_1) = 19.9$,
$(d_0/d_2) = 0.32$

As for the above special toric surface r(Y), an analytical representation is attainable by substituting the values Y (=$d_0 \times \theta$) corresponding to the values θ for the following equation:

$$r(Y) = a + b \cdot Y^2 + c \cdot Y^4 + d \cdot Y^6 + e \cdot Y^8 + f \cdot Y^{10} + g \cdot Y^{12}$$

and determining the coefficients a–g by use of simultaneous equations.

FIGS. 18–23 respectively show field curvatures and distortional aberrations relating to Examples 1–6. In each figure, a field curvature represented by a solid and and a field curvature represented by a dashed line relate to the main scanning direction and the subscanning direction, respectively. The field curvature in the main scanning direction and the distortional aberration are effectively corrected by the nonarcuate shapes $X_1(Y)$ and $X_2(Y)$ determining the configuration of the lens in the polarization plane. Particularly, in Examples 4 and 5, the field curvature in the main scanning direction and the distortional aberration are both desirable.

The distortional aberration relates to the uniform velocity scanning function. The scanning velocity of the beam spot tends to increase with an increase in image height due to the beam polarized at a uniform angular velocity. In light of this, uniform velocity scanning is desirably realized by causing the aberration to increase at the portion where the image height increases, as illustrated. Further, the field curvature in the subscanning direction is desirably corrected by the special toric surface.

In Examples 7–15 to be described, both the first and second lens surfaces, as counted from the polarizer side, are convex in the polarization plane, and each is a special toric surface. FIG. 17B shows the first lens surface while FIG. 17C shows the second lens surface. Only the data relating to the performance (field curvatures and uniform scanning) in the direction corresponding to the main scanning direction, i.e., shape data in the polarization plane are given. The data relating to the direction corresponding to the subscanning direction, i.e., the radius of curvature r(Y) in the above direction at the coordinate Y relating to the main scanning direction are optimized in each Example in a particular manner.

Example 7

$S = \infty$, $fm = 139.256$

| i | $R_i$ | $d_i$ | N |
|---|---|---|---|
| 0 | | 33.047 | |
| 1 | 153.181 | 11.223 | 1.57210 |
| 2 | −161.581 | 134.898 | |

$X_1(Y)$:
$R_1 = 153.181$, $K_1 = -15.522$,
$A_1 = -4.90025 \times 10^{-7}$, $B_1 = -3.62007 \times 10^{-11}$,
$C_1 = 1.57778 \times 10^{-14}$, $D_1 = 4.52347 \times 10^{-18}$
$X_2(Y)$:
$R_2 = -161.581$, $K_2 = 4.90839$,
$A_2 = 2.30522 \times 10^{-8}$, $B_2 = -1.60484 \times 10^{-10}$,
$C_2 = -5.10123 \times 10^{-14}$, $D_2 = 1.59010 \times 10^{-17}$
$(W/L) = 1.17$, $(W/L)^2 \cdot (L/d_1) = 21.9$,
$(d_0/d_2) = 0.24$, $R_1/fm = 1.1$ Example 8

$S = \infty$, $fm = 137.047$

| i | $R_i$ | $d_i$ | N |
|---|---|---|---|
| 0 | | 34.511 | |
| 1 | 274.094 | 12.045 | 1.57210 |
| 2 | −108.062 | 133.443 | |

$X_1(Y)$:
$R_1 = 274.094$, $K_1 = -0.488153$,
$A_1 = -3.90047 \times 10^{-7}$, $B_1 = -3.64736 \times 10^{-11}$,
$C_1 = 1.52644 \times 10^{-14}$, $D_1 = -4.46187 \times 10^{-18}$
$X_2(Y)$:
$R_2 = -108.062$, $K_2 = 2.98552$,
$A_2 = 3.11749 \times 10^{-7}$, $B_2 = 2.04686 \times 10^{-11}$,
$C_2 = -4.65135 \times 10^{-14}$, $D_2 = 1.16507 \times 10^{-17}$
$(W/L) = 1.17$, $(W/L)^2 \cdot (L/d_1) = 20.3$,
$(d_0/d_2) = 0.26$, $R_1/fm = 2.0$

Example 9

| S = ∞, fm = 137.041 | | | |
|---|---|---|---|
| i | $R_i$ | $d_i$ | N |
| 0 | | 34.305 | |
| 1 | 205.561 | 11.945 | 1.57210 |
| 2 | −124.060 | 133.750 | |

$X_1(Y)$:
$R_1 = 205.561$, $K_1 = -4.42977$,
$A_1 = -4.58583 \times 10^{-7}$, $B_1 = -3.92890 \times 10^{-11}$,
$C_1 = 1.47898 \times 10^{-14}$, $D_1 = -8.64090 \times 10^{-19}$
$X_2(Y)$:
$R_2 = -124.060$, $K_2 = 3.52004$,
$A_2 = 3.24804 \times 10^{-7}$, $B_2 = -9.05801 \times 10^{-11}$,
$C_2 = -4.80823 \times 10^{-14}$, $D_2 = 1.45322 \times 10^{-17}$
$(W/L) = 1.17$, $(W/L)^2 \cdot (L/d_1) = 20.5$,
$(d_0/d_2) = 0.26$, $R_1/fm = 1.5$

Example 10

| S = 413.282, fm = 179.979 | | | |
|---|---|---|---|
| i | $R_i$ | $d_i$ | N |
| 0 | | 42.725 | |
| 1 | 197.976 | 17.897 | 1.51933 |
| 2 | −171.592 | 114.304 | |

$X_1(Y)$:
$R_1 = 197.976$, $K_1 = 5.03422$,
$A_1 = -4.91745 \times 10^{-7}$, $B_1 = -1.83806 \times 10^{-11}$,
$C_1 = 1.63101 \times 10^{-14}$, $D_1 = -8.38595 \times 10^{-19}$
$X_2(Y)$:
$R_2 = -171.592$, $K_2 = 4.60861$,
$A_2 = -3.38197 \times 10^{-8}$, $B_2 = 3.65873 \times 10^{-11}$,
$C_2 = -5.14531 \times 10^{-14}$, $D_2 = 1.28251 \times 10^{-17}$
$(W/L) = 1.20$, $(W/L)^2 \cdot (L/d_1) = 14.1$,
$(d_0/d_2) = 0.37$, $R_1/fm = 1.1$

Example 11

| S = 492.845, fm = 168.271 | | | |
|---|---|---|---|
| i | $R_i$ | $d_i$ | N |
| 0 | | 45.430 | |
| 1 | 252.407 | 17.300 | 1.51933 |
| 2 | −130.535 | 117.270 | |

$X_1(Y)$:
$R_1 = 252.407$, $K_1 = 5.43257$,
$A_1 = -3.90428 \times 10^{-7}$, $B_1 = -6.84195 \times 10^{-12}$,
$C_1 = 1.88037 \times 10^{-14}$, $D_1 = -2.13891 \times 10^{-18}$
$X_2(Y)$:
$R_2 = -130.535$, $K_2 = -0.03984$,
$A_2 = 2.85512 \times 10^{-8}$, $B_2 = 2.12059 \times 10^{-11}$,
$C_2 = -2.76749 \times 10^{-14}$, $D_2 = 1.01019 \times 10^{-17}$
$(W/L) = 1.17$, $(W/L)^2 \cdot (L/d_1) = 14.2$,
$(d_0/d_2) = 0.39$, $R_1/fm = 1.5$

Example 12

| S = 746.803, fm = 156.939 | | | |
|---|---|---|---|
| i | $R_i$ | $d_i$ | N |
| 0 | | 45.457 | |
| 1 | 313.879 | 14.337 | 1.57210 |
| 2 | −123.669 | 124.216 | |

$X_1(Y)$:
$R_1 = 313.879$, $K_1 = 11.63499$,
$A_1 = -2.71261 \times 10^{-7}$, $B_1 = -2.54808 \times 10^{-11}$,
$C_1 = 1.96321 \times 10^{-14}$, $D_1 = -2.73780 \times 10^{-18}$
$X_2(Y)$:
$R_2 = -123.669$, $K_2 = -0.03984$,
$A_2 = 1.30110 \times 10^{-7}$, $B_2 = 5.58410 \times 10^{-11}$,
$C_2 = -3.31374 \times 10^{-14}$, $D_2 = 1.13522 \times 10^{-17}$
$(W/L) = 1.17$, $(W/L)^2 \cdot (L/d_1) = 17.1$,
$(d_0/d_2) = 0.33$, $R_1/fm = 2.0$

Example 13

| S = −1066.595, fm = 124.231 | | | |
|---|---|---|---|
| i | $R_i$ | $d_i$ | N |
| 0 | | 27.989 | |
| 1 | 136.654 | 10.110 | 1.57210 |
| 2 | −144.109 | 136.660 | |

$X_1(Y)$:
$R_1 = 136.654$, $K_1 = -89.8649$,
$A_1 = -3.58249 \times 10^{-6}$, $B_1 = 1.82151 \times 10^{-9}$,
$C_1 = -1.84033 \times 10^{-13}$, $D_1 = 5.22868 \times 10^{-17}$
$X_2(Y)$:
$R_2 = -144.109$, $K_2 = 7.53274$,
$A_2 = -4.10849 \times 10^{-6}$, $B_2 = 2.30006 \times 10^{-9}$,
$C_2 = -1.92530 \times 10^{-12}$, $D_2 = 9.95898 \times 10^{-16}$
$(W/L) = 1.20$, $(W/L)^2 \cdot (L/d_1) = 25.0$,
$(d_0/d_2) = 0.20$, $R_1/fm = 1.1$

Example 14

| S = −646.979, fm = 118.255 | | | |
|---|---|---|---|
| i | $R_i$ | $d_i$ | N |
| 0 | | 28.8 | |
| 1 | 177.382 | 10.725 | 1.57210 |
| 2 | −106.959 | 140.375 | |

$X_1(Y)$:
$R_1 = 177.382$, $K_1 = -187.605$,
$A_1 = -3.29591 \times 10^{-6}$, $B_1 = 1.90010 \times 10^{-9}$,
$C_1 = -1.89600 \times 10^{-13}$, $D_1 = -2.05784 \times 10^{-17}$
$X_2(Y)$:
$R_2 = -106.959$, $K_2 = 5.99435$,
$A_2 = -3.44944 \times 10^{-6}$, $B_2 = 2.49373 \times 10^{-9}$,
$C_2 = -1.83255 \times 10^{-12}$, $D_2 = 1.03695 \times 10^{-15}$
$(W/L) = 1.17$, $(W/L)^2 \cdot (L/d_1) = 24.5$,
$(d_0/d_2) = 0.21$, $R_1/fm = 1.5$

Example 15

| | | | |
|---|---|---|---|
| S = −607.344, fm = 117.840 | | | |
| i | $R_i$ | $d_i$ | N |
| 0 | | 26.108 | |
| 1 | 235.681 | 13.292 | 1.57210 |
| 2 | −92.489 | 140.500 | |

$X_1(Y)$ (=$x_1(Y)$):
$R_1 = 235.681$, $K_1 = -426.354$,
$A_1 = -3.07964 \times 10^{-6}$, $B_1 = 2.02800 \times 10^{-9}$,
$C_1 = -1.70546 \times 10^{-13}$, $D_1 = -9.47523 \times 10^{-17}$
$X_2(Y)$:
$R_2 = -92.489$, $K_2 = 4.42119$,
$A_2 = -2.74485 \times 10^{-6}$, $B_2 = 2.50025 \times 10^{-9}$,
$C_2 = -1.83661 \times 10^{-12}$, $D_2 = 1.05160 \times 10^{-15}$
$(W/L) = 1.17$, $(W/L)^2 \cdot (L/d_1) = 18.44$,
$(d_0/d_2) = 0.19$, $R_1/fm = 2.0$ FIGS. 24–32 respectively show field curvatures and distortional aberrations relating to Examples 7–15. Both the field curvatures and distortional aberrations relate to the main scanning direction and effectively corrected by the nonarcuate shapes $X_1(Y)$ and $X_2(Y)$. Adjustment is so made as to enhance the uniform scanning characteristic because the distortional aberration relates to the uniform scanning capability, as stated earlier.

As stated above, the second embodiment achieves the following advantages.

(1) Despite that a scanning lens has a simple structure, it implements both the uniform velocity scanning function and the field curvature correcting function in the main scanning direction which are indispensable for a focusing lens as to the main scanning direction. In addition, the lens is free from errors in configuration ascribable to the molding of plastics.

(2) Because an image forming lens includes a scanning lens therein, a compact, yet broad, effective main scanning range is achievable and reduces the cost.

Various modifications will become possible for those skilled in the art after receiving the teachings of the present disclosure without departing from the scope thereof.

What is claimed is:

1. An image forming apparatus, comprising:

a light source for emitting a beam;

a beam deflector for deflecting the beam from said light source; and an optical scanning lens for converging the deflected beam to a beam spot on a surface to be scanned so as to scan said surface to be scanned, wherein said optical scanning lens comprises a single lens, and said single lens comprises a first lens surface and a second lens surface as counted from a beam deflector side, at least one of said first and second lens surfaces lens having a nonarcuate shape in a deflection plane determined by:

$$X = Y^2 \Big/ \Big[R + R\sqrt{\{1-(1+K)(Y/R)^2\}}\,\Big] +$$
$$A \cdot Y^4 + B \cdot Y^6 + C \cdot Y^8 + D \cdot Y^{10} + \cdots$$

where X represents a coordinate in an optical axis direction, Y represents a coordinate in a direction perpendicular to the optical axis direction, R represents a paraxial axis curvature radius, K represents a cone constant, A, B, C, D, . . . represent high order coefficients, respectively, R, K, A, B, C, D, . . . being given for specifying said nonarcuate shape;

at least one of said first and second lens surfaces being a special toric surface such that a line connecting centers of curvatures of said at least one lens surface in planes perpendicular to said deflection plane forms a curve different in shape from said at least one lens surface in said deflection plane; and a shape of said optical scanning lens in a plane perpendicular to said deflection plane containing the optical axis is a meniscus shape such that a side of said first lens surface corresponds to a concave surface of said meniscus shape, said optical scanning lens provided in an optical scanning device in which a beam, which forms a line image elongated in a direction corresponding to a main scanning direction, is deflected at a uniform angular velocity by said beam deflector which has a reflection surface in proximity to an image forming position, said optical scanning lens converging the beam onto a surface to be scanned as a beam spot so that said surface to be scanned is optically scanned.

2. The image forming apparatus according to claim 1, wherein:

$r_{s1}'(O)$ and $r_{s2}'(O)$ are set so that $|\beta(O)|$ satisfies the following condition:

$$1.45 \leq |\beta(O)| \leq 4.75,$$

where $|\beta(\theta)| = \{1(\theta) + r_{s2}'(Y') \cdot P(\theta)\}/\{S(\theta) - r_{s1}'(Y)P(\theta)\}$, and $P(\theta) = d(\theta)/[n\{r_{s2}'(Y') - r_{s1}'(Y)\} + (n-1)\cdot d(\theta)]$, where Y and Y' represent coordinates in a direction corresponding to the main scanning direction of positions at which a principal ray of the deflected beam is incident onto said first lens surface of said optical scanning lens at a deflection angle θ and at which the principal ray of said deflected beam exits from the said second lens surface of said optical scanning lens, respectively, S(θ) represents a distance from the line image forming position to the incident position, d(θ) represents a distance between the incident position and exit position, 1(θ) represents a distance from the exit position to the image forming position which is a position in a direction corresponding to a subscanning direction, $r_{s1}'(Y)$, $r_{s2}'(Y')$ represent curvature radii of said first and second lens surfaces at the incident position and the exit position, in proximity to the respective principal rays, in planes perpendicular to said deflection plane and including the respective principal rays, respectively, and n represents refractive index of a material of said optical scanning lens for a wavelength to be used.

3. The image forming apparatus according to claim 1, wherein:

$r_{s1}'(Y)$ and $r_{s2}'(Y')$ are set so that $|\beta(\theta)|$ satisfies the following condition in an effective scanning range:

$$0.95\,|\beta(\theta)| \leq |\beta(\theta)| \leq 1.05\,|\beta(\theta)|,$$

where $|\beta(\theta)|=\{1(\theta)+r_{s2}'(Y')\cdot P(\theta)\}/\{S(\theta)-r_{s1}'(Y)P(\theta)\}$, and $P(\theta)=d(\theta)/[n\{r_{s2}'(Y')-r_{s1}'(Y)\}+(n-1)\cdot d(\theta)]$, where Y and Y' represent coordinates in a direction corresponding to the main scanning direction of positions at which a principal ray of the deflected beam is incident onto said first lens surface of said optical scanning lens at a deflection angle θ and at which the principal ray of said deflected beam exits from a lens surface of said optical scanning lens of the side of said surface to be scanned, respectively, S(θ) represents a distance from the line image forming position to the incident position, d(θ) represents a distance between the incident position and exit position, 1(θ) represents a distance from the exit position to the image forming position which is a position in a direction corresponding to a subscanning direction, $r_{s1}'(Y)$, $r_{s2}'(Y')$ represent curvature radii of said first and second lens surfaces at the incident position and the exit position, in proximity to the respective principal rays, in planes perpendicular to said deflection plane and including the respective principal rays, respectively, and n represents refractive index of a material of said optical scanning lens for a wavelength to be used.

4. The image forming apparatus according to claim 1, wherein:

said first lens surface of said optical scanning lens comprises a nonarcuate toric surface formed when a nonarcuate shape is rotated about an axis parallel to a direction corresponding to the main scan direction; and said second lens surface of said optical scanning lens comprises a special toric surface having a nonarcuate shape in said deflection plane.

5. The image forming apparatus according to claim 1, wherein:

said first lens surface of said optical scanning lens comprises a nonarcuate toric surface formed when a nonarcuate shape is rotated about an axis parallel to a direction corresponding to the main scan direction; and said second lens surface of said optical scanning lens comprises a special toric surface having an arcuate shape in said deflection plane.

6. The image forming apparatus according to claim 1, wherein each of said first and second lens surfaces of said optical scanning lens comprise a special toric surface having a nonarcuate shape in said deflection plane.

7. An image forming method, comprising the steps of:

emitting a beam;

deflecting the beam; and converging the deflected beam to a beam spot on a surface to be scanned so as to scan said surface to be scanned, through an optical scanning lens, wherein said optical scanning lens comprises a single lens, and said single lens comprises a first lens surface and a second lens surface as counted from a beam deflector side, at least one of said first and second lens surfaces lens having a nonarcuate shape in a deflection plane determined by:

$$X = Y^2 / \left[R + R\sqrt{\{1-(1+K)(Y/R)^2\}}\right] + A\cdot Y^4 + B\cdot Y^6 + C\cdot Y^8 + D\cdot Y^{10} + \cdots$$

where X represents a coordinate in an optical axis direction, Y represents a coordinate in a direction perpendicular to the optical axis direction, R represents a paraxial axis curvature radius, K represents a cone constant, A, B, C, D, . . . represent high order coefficients, respectively, R, K, A, B, C, D, . . . being given for specifying said nonarcuate shape;

at least one of said first and second lens surfaces being a special toric surface such that a line connecting centers of curvatures of said at least one lens surface in planes perpendicular to said deflection plane forms a curve different in shape from said at least one lens surface in said deflection plane; and a shape of said optical scanning lens in a plane perpendicular to said deflection plane containing the optical axis is a meniscus shape such that a side of said first lens surface corresponds to a concave surface of said meniscus shape, said optical scanning lens provided in an optical scanning device in which a beam, which forms a line image elongated in a direction corresponding to a main scanning direction, is deflected at a uniform angular velocity by said beam deflector which has a reflection surface in proximity to an image forming position, said optical scanning lens converging the beam onto a surface to be scanned as a beam spot so that said surface to be scanned is optically scanned.

8. The image forming method according to claim 7, wherein:

$r_{s1}'(O)$ and $r_{s2}'(O)$ are set so that $|\beta(O)|$ satisfies the following condition:

$$1.45 \leq |\beta(O)| \leq 4.75,$$

where $|\beta(\theta)|=\{1(\theta)+r_{s2}'(Y')\cdot P(\theta)\}/\{S(\theta)-r_{s1}'(Y)P(\theta)\}$, and $P(\theta)=d(\theta)/[n\{r_{s2}'(Y')-r_{s1}'(Y)\}+(n-1)\cdot d(\theta)]$, where Y and Y' represent coordinates in a direction corresponding to the main scanning direction of positions at which a principal ray of the deflected beam is incident onto said first lens surface of said optical scanning lens at a deflection angle θ and at which the principal ray of said deflected beam exits from the said second lens surface of said optical scanning lens, respectively, S(θ) represents a distance from the line image forming position to the incident position, d(θ) represents a distance between the incident position and exit position, 1(θ) represents a distance from the exit position to the image forming position which is a position in a direction corresponding to a subscanning direction, $r_{s1}'(Y)$, $r_{s2}'(Y')$ represent curvature radii of said first and second lens surfaces at the incident position and the exit position, in proximity to the respective principal rays, in planes perpendicular to said deflection plane and including the respective principal rays, respectively, and n represents refractive index of a material of said optical scanning lens for a wavelength to be used.

9. The image forming method according to claim 7, wherein:

$r_{s1}'(Y)$ and $r_{s2}'(Y')$ are set so that $|\beta(\theta)|$ satisfies the following condition in an effective scanning range:

$$0.95\ |\beta(\theta)| \leq |\beta(\theta)| \leq 1.05\ |\beta(\theta)|,$$

where $|\beta(\theta)|=\{1(\theta)+r_{s2}'(Y')\cdot P(\theta)\}/\{S(\theta)-r_{s1}'(Y)P(\theta)\}$, and $P(\theta)=d(\theta)/[n\{r_{s2}'(Y')-r_{s1}'(Y)\}+(n-1)\cdot d(\theta)]$, where Y and Y' represent coordinates in a direction corresponding to the main scanning direction of positions at which a principal ray of the deflected beam is incident onto said first lens surface of said optical scanning lens at a deflection angle θ and at which the principal ray of said deflected beam exits from a lens surface of said optical scanning lens of the side of said surface to be scanned, respectively, S(θ) represents a distance from the line image forming position to the incident position, d(θ) represents a distance between the incident position and exit position, 1(θ) represents a distance from the exit position to the image forming position which is a position in a direction corresponding to a subscanning direction, $r_{s1}'(Y)$, $r_{s2}'(Y')$ represent curvature radii of said first and second lens surfaces at the incident position and the exit position, in proximity to the respective principal rays, in planes perpendicular to said deflection plane and including the respective principal rays, respectively, and n represents refractive index of a material of said optical scanning lens for a wavelength to be used.

10. The image forming method according to claim 7, wherein:

said first lens surface of said optical scanning lens comprises a nonarcuate toric surface formed when a nonarcuate shape is rotated about an axis parallel to a direction corresponding to the main scan direction; and said second lens surface of said optical scanning lens comprises a special toric surface having a nonarcuate shape in said deflection plane.

11. The image forming method according to claim 7, wherein:

said first lens surface of said optical scanning lens comprises a nonarcuate toric surface formed when a nonarcuate shape is rotated about an axis parallel to a direction corresponding to the main scan direction; and said second lens surface of said optical scanning lens comprises a special toric surface having an arcuate shape in said deflection plane.

12. The image forming method according to claim 7, wherein each of said first and second lens surfaces of said optical scanning lens comprise a special toric surface having a nonarcuate shape in said deflection plane.

* * * * *